March 16, 1948. F. M. CARROLL ET AL 2,438,036
PLURAL STORAGE DEVICE ACCOUNTING MACHINE
Filed Dec. 23, 1943 15 Sheets-Sheet 1

INVENTORS
Fred M. Carroll
Alfred B. Benson
BY
ATTORNEY

March 16, 1948. F. M. CARROLL ET AL 2,438,036
PLURAL STORAGE DEVICE ACCOUNTING MACHINE
Filed Dec. 23, 1943 15 Sheets-Sheet 2

INVENTOR
Fred M. Carroll
Alfred B. Benson
BY
W. M. Wilson ATTORNEY

March 16, 1948. F. M. CARROLL ET AL 2,438,036
PLURAL STORAGE DEVICE ACCOUNTING MACHINE
Filed Dec. 23, 1943 15 Sheets-Sheet 8

INVENTORS
Fred M. Carroll
Alfred B. Buson
BY
W. M. Wilson ATTORNEY

March 16, 1948.  F. M. CARROLL ET AL  2,438,036
PLURAL STORAGE DEVICE ACCOUNTING MACHINE
Filed Dec. 23, 1943   15 Sheets-Sheet 9

INVENTORS
Fred M. Carroll
Alfred B. Benson
BY
ATTORNEY

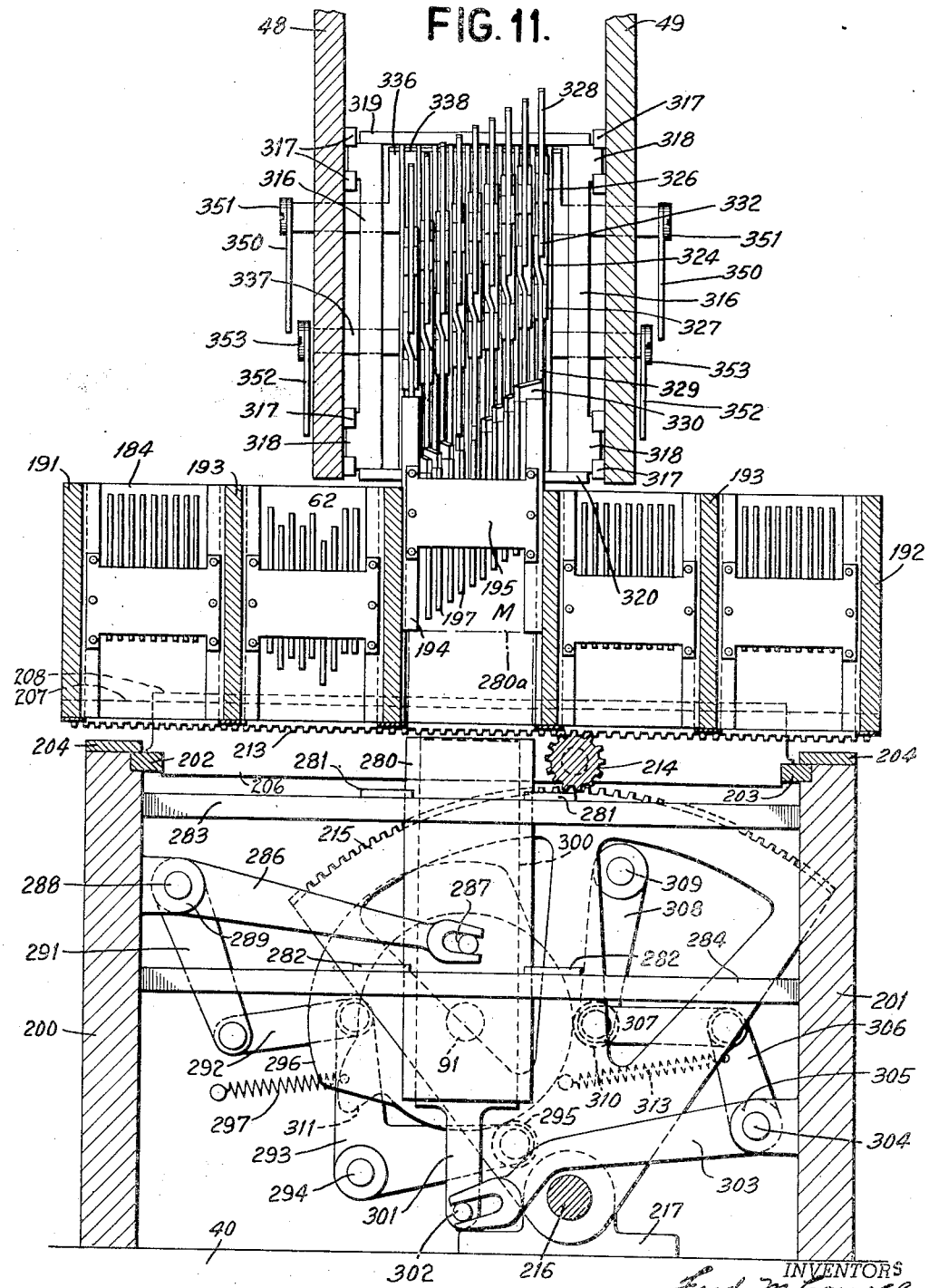

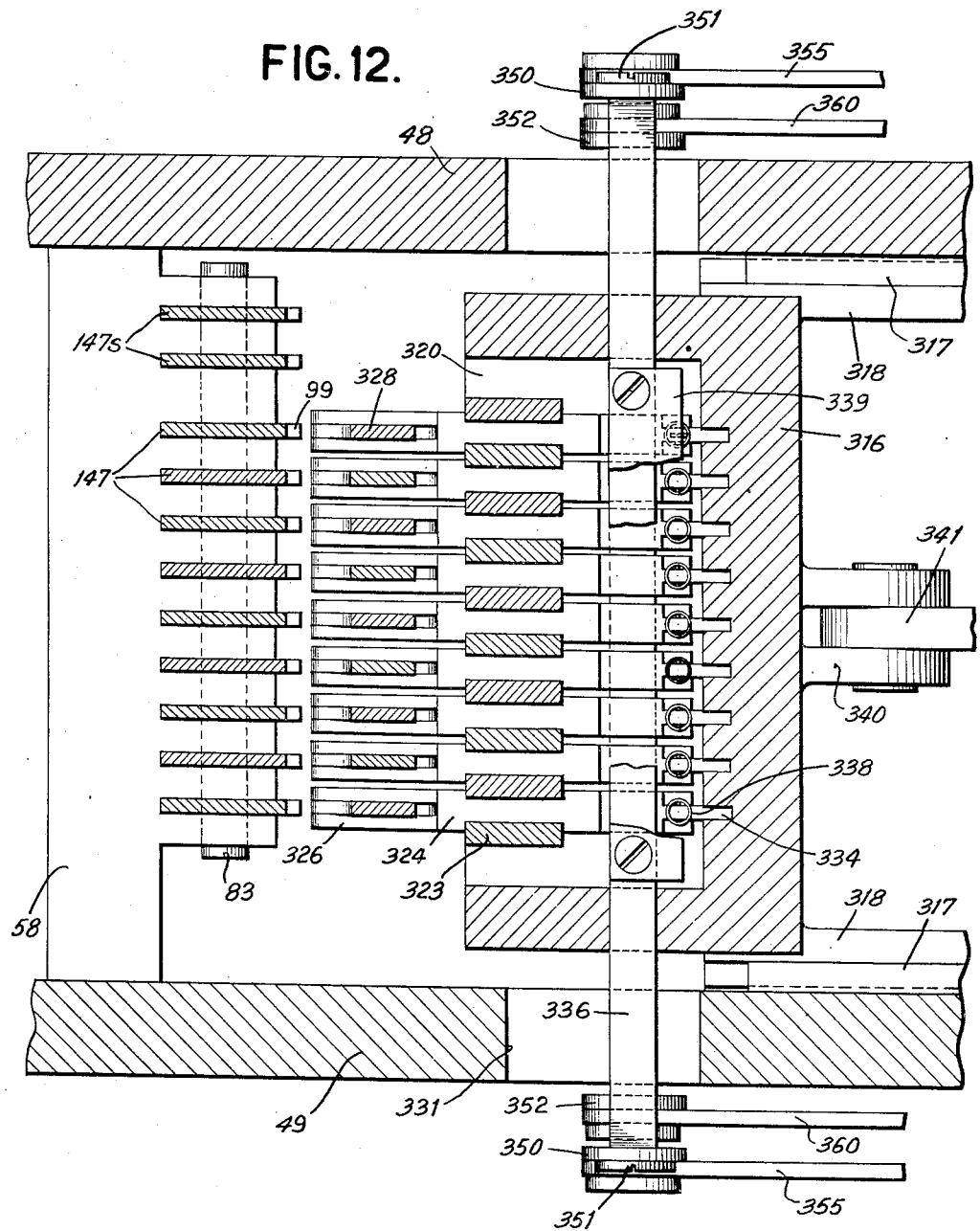

March 16, 1948. F. M. CARROLL ET AL 2,438,036
PLURAL STORAGE DEVICE ACCOUNTING MACHINE
Filed Dec. 23, 1943 15 Sheets-Sheet 12

INVENTORS
Fred M. Carroll
Alfred B. Benson
BY
W. M. Wilson ATTORNEY

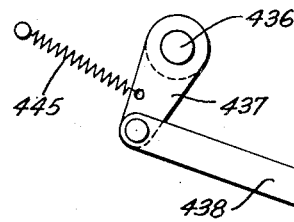
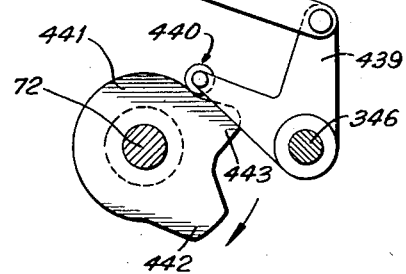
FIG. 13.
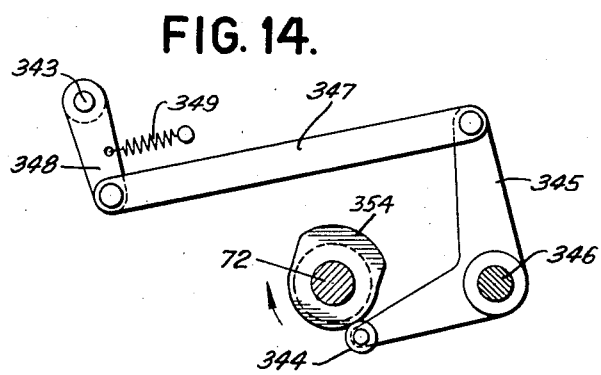
FIG. 14.
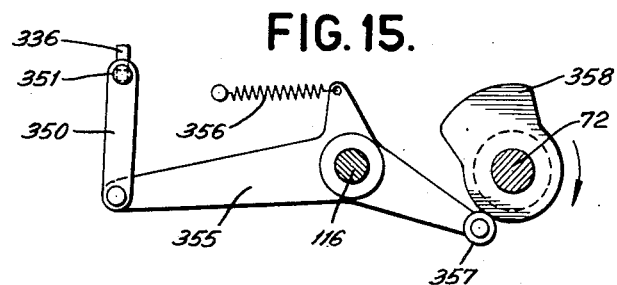
FIG. 15.
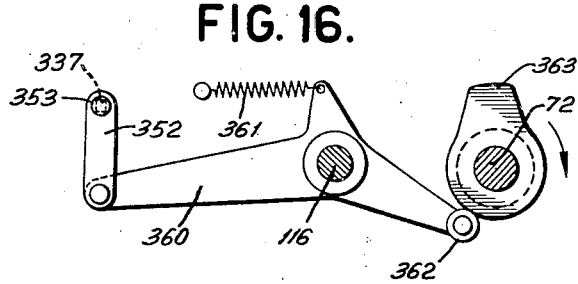
FIG. 16.

March 16, 1948.   F. M. CARROLL ET AL   2,438,036
PLURAL STORAGE DEVICE ACCOUNTING MACHINE
Filed Dec. 23, 1943   15 Sheets-Sheet 14

INVENTORS
Fred M. Carroll
Alfred B. Benson
BY
W. M. Wilson
ATTORNEY

March 16, 1948.                F. M. CARROLL ET AL                2,438,036
                    PLURAL STORAGE DEVICE ACCOUNTING MACHINE
                        Filed Dec. 23, 1943        15 Sheets-Sheet 15
FIG. 21.
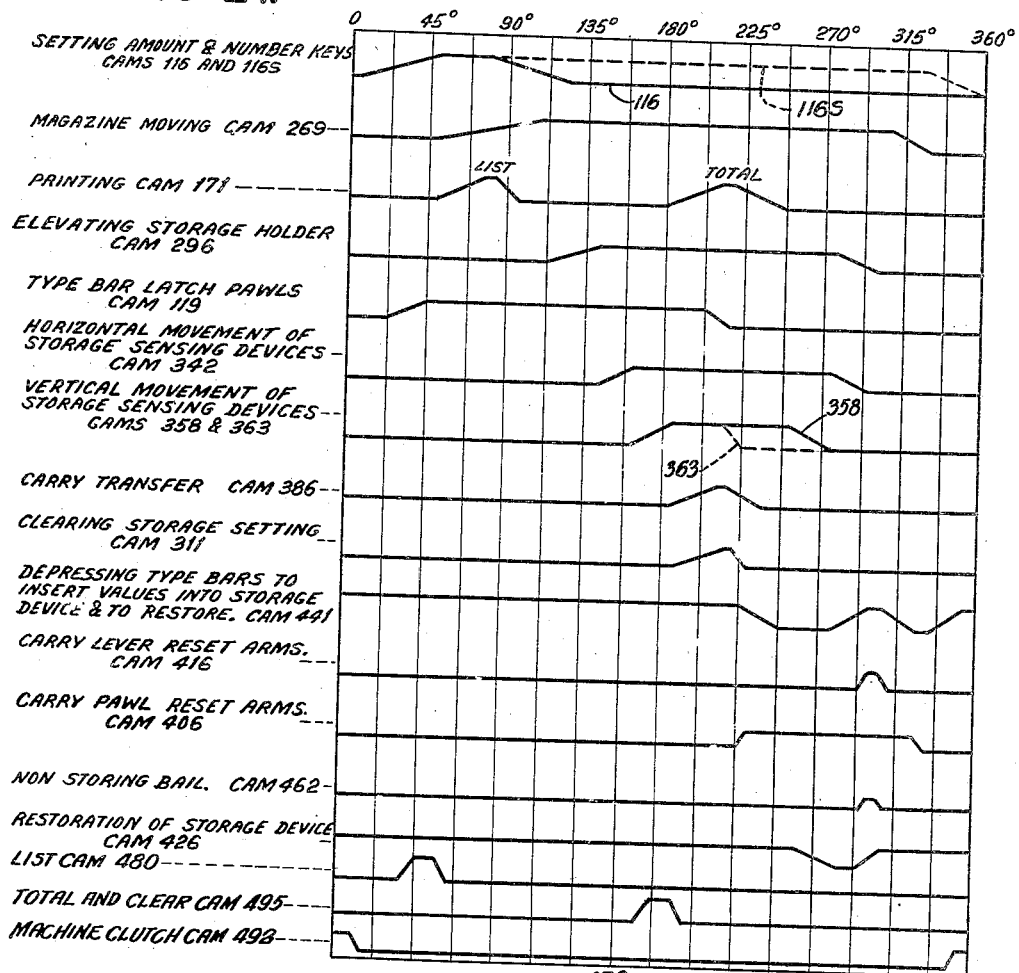
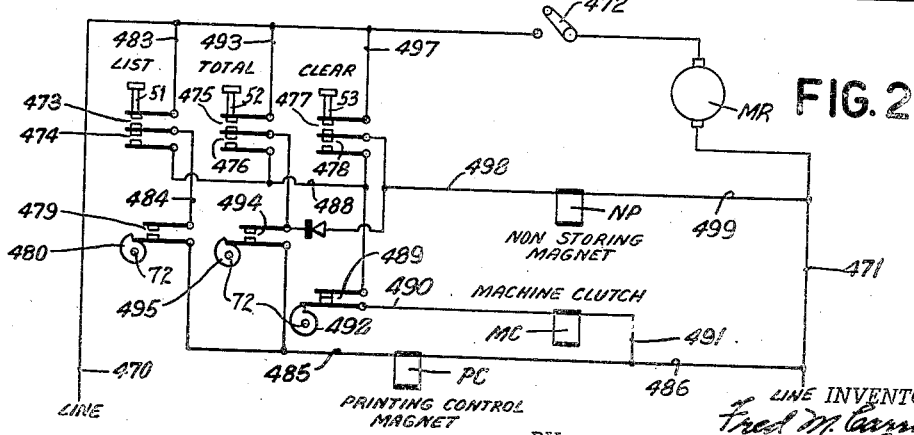
FIG. 22.
INVENTORS
Fred M. Carroll
Alfred B. Benson
BY
ATTORNEY Patented Mar. 16, 1948

2,438,036

UNITED STATES PATENT OFFICE 2,438,036

PLURAL STORAGE DEVICE ACCOUNTING MACHINE

Fred M. Carroll, Binghamton, and Alfred B. Benson, Union, N. Y., assignors to International Business Machines Corporation, New York, N. Y., a corporation of New York Application December 23, 1943, Serial No. 515,374

20 Claims. (Cl. 235—60)

This invention relates generally to improvements in printing machines and more specifically to a key controlled printing mechanism, wherein the printer exercises control over entries of amounts into selected amount storage devices and in turn acts as a receiver of amounts read out of any one of a plurality of said storage devices.

An object of the invention is the provision of a set of type bars as an intermediary between item entry devices and amount storage devices. The type bars are controlled to govern the adjustment of settable storage controls in any one of a number of amount registering and storage devices. Said type bars are also the receivers of amounts read out of a selected storage device and thereby added to an item amount to formulate a total or new balance.

Another object of the invention is the provision of an accounting machine having mechanical means for registering and storing data concerning a large number of accounts. To avoid the customary procedure of referring to separate records for determining old balances and previous standings of accounts, the present machine provides storage facilities and means for selecting any one of a plurality of account representing mechanisms.

An object of the invention is the provision of a magazine holding a plurality of thin storage frames, each containing a plurality of settable pins adjustable differentially to represent a multidenominational amount. The magazine is mounted for movement in two directions over a stationary frame selector, so that any one of a plurality of storage frames may be brought into the selective position for control by, and control over, item and total printing mechanism. Movement of the magazine is controlled by a pair of banks of selection keys which not only select a storage frame but also control printing of an account member.

Another object of the invention is the provision of a mechanical sensing device cooperating with the settable pins of a storage device and the type bars of a printer. These sensing devices are so controlled by the settable pins that the amount registered thereby is added to any amount already registered on the type bars and represented by the extent of displacement from a normal position.

Another object of the invention is the provision of a set of type bars having a double set of type elements and a double set of adjusting mechanisms adapting them for control by item entry keys and storage device sensing mechanisms and thereby receptive of adjustments representing total amounts, the components of which are received in a single cycle.

Another object of the invention is the provision of carrying or transferring mechanism cooperating with a type bar and controlled by the linear movement thereof, so that movement beyond nine steps causes an increment of movement of the next higher order type bar. The customary construction of carrying devices involves the use of rotary tripping controls and rotary actuators for advancing higher orders. In the present instance, the controls are linear in that the type bar is the tripping control for indicating that an amount higher than 9 has been added, and the transfer movement is also linear in that the next higher type bar is lifted vertically one step to add a unit.

It is a further object of the invention to provide controls for regulating the type of printing operation involving amount storage control or independent thereof. A set of three control keys, namely, "List," "Total" and "Clear," are provided to determine the type of operation. When the list key is used, the printer is controlled to receive the amounts set up by the keys and to print said amount before storing it. When the total key is used, the item amount is received, the amount read from the related one of the storage devices is added to the item amount and, near the end of the cycle, the total amount is printed and the new balance is entered in the selected storage device. Operation of the clear key involves the same style of operation as mentioned in connection with the total key, but in this instance the total amount is not communicated back to the storage device. Instead, the amount is read out of the storage mechanism and the mechanism is restored to zero as the total is printed.

A further object of the invention is the provision of a magazine for storage amount representing holders or frames with the frames representing accounts numbered with odd numbers in the tens order, separated from the frames of accounts of numbers designated by even numbers in the tens order. The magazine is controlled for movement by two banks of keys with the tens order bank of keys having camming devices for selecting the direction of selecting movement of the magazine. Compartments are arranged in the magazine so that the storage devices are aligned in groups of ten and the home selecting position is centralized, so that the shortest possible distance of movement of the magazine is used to bring a selected storage frame into the effective position. The tens order direction control cam not only governs movement of the magazine to select the group of frames but it also controls further movement of the magazine to select a certain frame within the selected group.

Other objects of the invention will be pointed out in the following description and claims and illustrated in the accompanying drawings, which disclose, by way of example, the principle of the invention and the best mode, which has been contemplated, of applying that principle.

In the drawings:

Fig. 11 is a sectional elevation view showing the magazine, the magazine positoning controls and the amount sensing device.

Fig. 12 is a sectional plan view through the amount sensing devices cooperating with the type bars.

Fig. 13 is a detail view of the cam and control linkage operated to depress the type bars for setting a storage device.

Fig. 14 is a detail view showing the operating mechanism for controlling the horizontal movement of the value sensing devices.

Fig. 15 is a detail view of the operating controls for producing vertical restoring movement of the value sensing devices.

Fig. 16 is a detail view showing the cam operating linkage for moving the value sensing devices upward in a vertical direction.

Fig. 21 is a cam chart showing the timing of the cams in the machine.

Fig. 22 is a wiring diagram showing the electrical controls.

Figure 4:
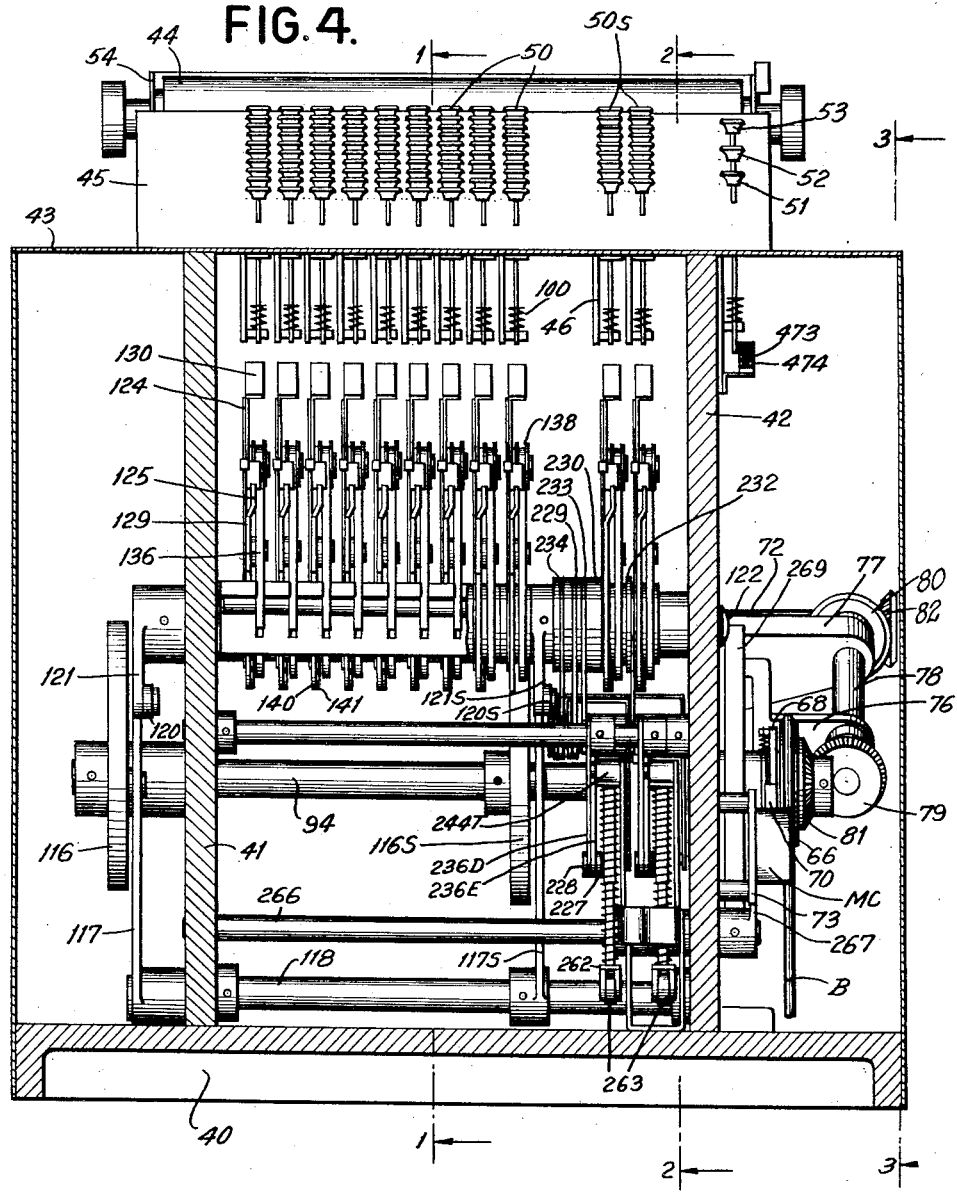
Fig. 4 is a front sectional elevation view showing the keyboard differential mechanism and the main operating shaft.

Referring to Fig. 4, it is seen that the illustrative machine is provided with nine banks of amount or item entry keys 50, and two banks of account number or storage device selection keys 50s. There are three other control keys, a "List" key 51, a "Total" key 52 and a "Clear" key 53. Depression of any one of the three control keys trips a main clutch and initiates one cycle of operation of the machine.

The mode of operation of the machine can be explained in a general way. In the machine is a magazine with one hundred storage devices representative of accounts or other statistical groupings and each having a capacity for nine denominations of amounts. The two banks of selection keys 50s are provided to control movement of the magazine to select one of the storage devices, so that it stands beneath the set of type bars so an amount can be added therein and/or amounts can be read therefrom.

Listing is accomplished by setting up an amount on the digit keys 50, setting an account number with keys 50s and depressing the list key 51. Then the type bars are lifted differentially and an item impression is effected on a record sheet. Meanwhile, the storage magazine is shifted under control of keys 50s and the storage device of the related account is lifted to a registering position underneath the type bars. Then, as the type bars are lowered to the home position, the amount represented thereon is entered into the storage device by depressing the storage setting pins differential distances representative of digit values. When the storage device is lowered back into the magazine, the settable pins remain in a stepped formation (see device #62 in Fig. 11) and retain the amount setting.

Should the selected storage device contain an amount before it is selected, this amount is added to the entered item amount before the storage device is readjusted. The addition or accumulation is performed by operation of the type bars to lift them to positions representative of the item amount plus the stored amount. Therefore, all amount type bars have a double set of digit positions because any one may be lifted nine steps for an item digit, lifted nine steps further in adding a stored digit, and then receive a still further upward shift of one step as a carry unit from the next lower order.

Cooperating with the type bars are operating devices which sense the amount registered in the selected storage device and then lift and advance the type bars to represent a total amount of an old balance plus an item amount. These same devices also serve to sense or read the total or final setting of the type bars and direct this reading back into the storage device by pushing the setting pins down differential distances. Also cooperating with the type bars are transferring or carrying mechanisms for raising higher order bars one step, when lower order bars are lifted more than nine steps.

When the total key 52 is depressed, the time of printing is delayed so that it occurs after the type bars are lifted through the second part of adjustment by the storage amount sensing mechanism in addition to the type adjustment under control of the keyboard. Of course, it is possible to take a total reading without an accompanying item entry by merely avoiding manipulation of the amount entry keys. As printing takes place, the storage pins are reset so that the old balance number is removed and the selected storage device is ready for the entry of the new total. After the total amount is recorded from the adjusted type bars, they are pushed down to the home position and, in so moving, carry along with them the storage sensing mechanism which communicates the differential type bar movement to the storage setting pins, so that they are again adjusted and now represent the new total. Near the end of the cycle, the storage device is lowered into the magazine and the magazine is moved back to its home position.

Operation of the "Clear" key serves to control machine operation just as the total key does with the exception that the printing hammers are not operated and the type bars are prevented from being lowered at a time while the storage device is raised. In other words, the selected storage device is cleared as usual and remains at zero when lowered into the magazine. Lowering of the type bars is caused by spring operated arms which are oscillated twice near the end of each "List" and "Total" cycle. During clearing operation, the spring arms are locked and withheld from operating for what is usually the first oscillation (the motion for putting the type bar reading into the storage device), but the secondary oscillation takes place to restore the type bars at a time when they have no effect on the storage device which is then fully lowered.

The framework of the machine is best shown in Figs. 1–5. There it is seen that a base 40 supports a pair of main side frames 41 and 42. A casing 43 covers all mechanisms except the platen 44 and the slanted keyboard cover plate 45. Each bank of keys is supported on an angle iron 46 fastened under plate 45, and the control keys 51, 52 and 53 (Figs. 3 and 4) have a similar support 47 fastened to the right side frame.

Between the main side frames (Fig. 5) is a pair of intermediate printer side frames 48 and 49 which are cut with a receding stepped formation (Fig. 2), to clear the differential shafts 152 and magazine M and yet extend to the rear of the machine and down to the base 40 for support. The printer frames are tied together by a bar 55 (Fig. 1) and are further stiffened by guide bars 56, 57, 58 and 59 fastened between them.

The platen 44 is rotatably assembled in a carriage frame 54 which has a pair of crossbars 60 and 61 cooperating with rollers on three stationary frame bars 63, 64 and 65 secured on slanted upper portions of main frames 41 and 42.

The machine is driven by a belt B (Figs. 3 and 4) which is operated by an electric motor with speed reduction gearing to a pulley. A driven pulley 66 is loosely mounted on a main drive shaft 94 which extends across the machine in bearings in both main side frames. Fastened to pulley 66 is a notched clutch disk 67 which is aligned with a clutch pawl 68 pivoted on an arm 69 fastened to the shaft 94. Pawl 68 is spring urged to engage the disk but is held out of engagement by a clutch armature latch 70, the head of which is wide enough to engage both a tail on the pawl and an extension on arm 69. A spring 71 holds the armature latch 70 normally operative so that the machine is then idle. However, upon the operation of any control key, the machine clutch magnet MC is energized, latch 70 is rocked counterclockwise to release pawl 68 which then rocks clockwise to engage the notch in disk 67, connecting shaft 94 to the pulley for rotation. The shaft is operated clockwise for one revolution, at the end of which latch 70 again engages arm 69 and pawl 68 to disengage the pawl from the constantly rotating disk and stop the shaft.

Magnet MC is mounted on a plate 73 which is fastened to the right side frame 42 by a pair of posts.

Figure 3:
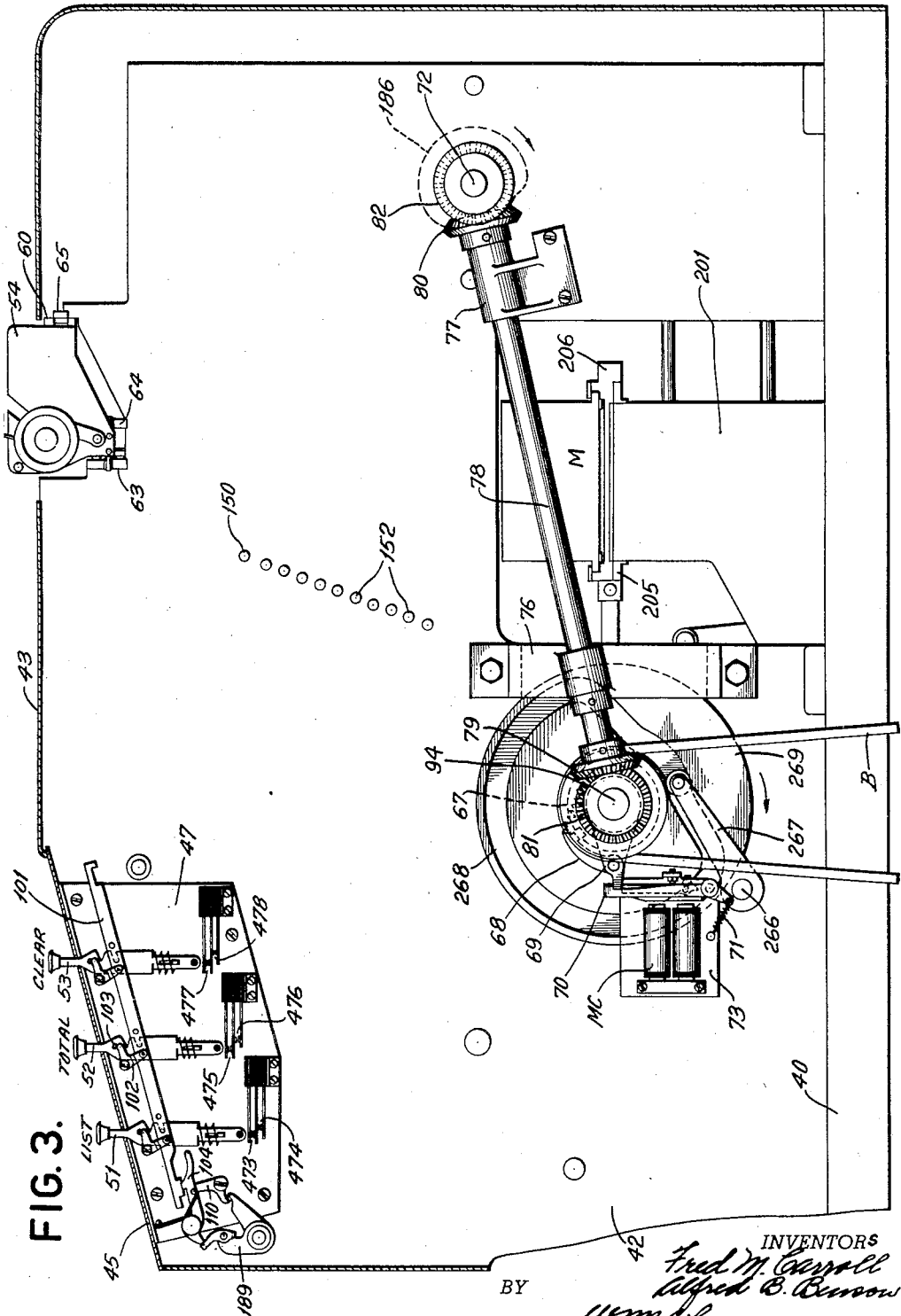
Fig. 3 is a right side elevation view showing the control keys and the main operating mechanism.

In Fig. 3 it is seen that a driving connection is provided between shaft 94 and a cam shaft 72 near the rear of the machine. A pair of bearing brackets 76 and 77 are secured to frame 42 to furnish support for a connecting shaft 78 having bevel gears 79 and 80 on its ends. Gear 79 meshes with a bevel gear 81 fastened to shaft 94 and gear 80 meshes with a bevel gear 82 fixed to shaft 72. Therefore, every time shaft 94 revolves, shaft 72 is turned one revolution in a counterclockwise direction.

From shaft 72 (Fig. 1) a train of operating connections are directed toward the storage magazine to control the lifting and lowering of a selected storage unit frame or holder. Fixed to shaft 72 is a bevel gear 84 in mesh with another bevel gear 85 secured to the top of a vertical shaft 86. At the lower end, shaft 86 is supported in a bearing 87 on a bracket 88 fastened to the base. Above the bearing is a bevel gear 89 also fastened to shaft 86 and meshing with a gear 90 fixed to a short horizontal cam shaft 91 (Fig. 11) which is used to control storage device operation as explained more fully hereinafter.

The keyboard mechanism and the differential controls between the keyboard and the type bars are of a form similar to the mechanisms shown in the patent to F. M. Carroll, No. 1,950,480, issued March 13, 1934. All other needed controls, such as the key release mechanism, are also similar to those of the patent.

Figure 1:
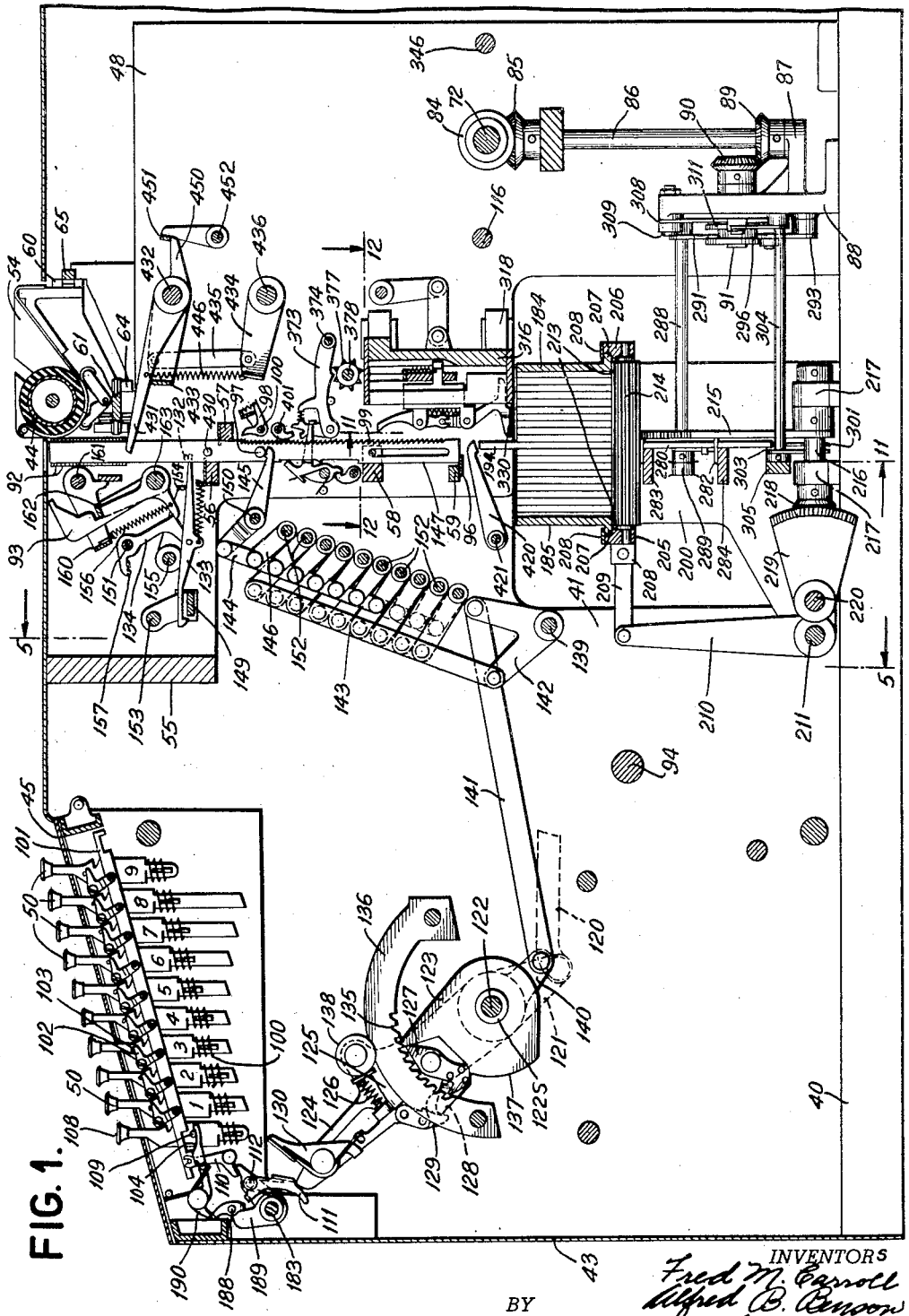
Fig. 1 is a side elevation view sectionalized to show the amount control keyboard, the printing mechanism and a portion of the magazine.

The item entry or amount setting operation may be best understood from Fig. 1 where it is seen that the amount keys 50 are held in upper position by springs 100. On depression of any key in a row, to select a particular digit for entry, the locking bar 101 is shifted to the left by bell cranks 102, one arm of each of which is pivoted to the bar 101 and the other arm of which coacts with a pin 103 on the shank of a key 50. When this bar is so moved, it is latched in its left hand position by a spring pressed latch 104, and pins on the bar encounter notches in the key shanks to hold the depressed key down and to lock the other keys in their upper position. Any setup may be erased before entry by an erasing key 108, the shank of which carries a pin 109 cooperating with latch 104 to release the same and permit the bar 101 to return to normal position under action of a spring when the erasing key is depressed. The movement of locking bar 101 to the left rocks a small bell crank 110 which cooperates with the tail of a zero latch 111 and rocks the latch clockwise about its pivot 112. This release of the zero latch is necessary to permit movement of the differential mechanism.

Figure 2:
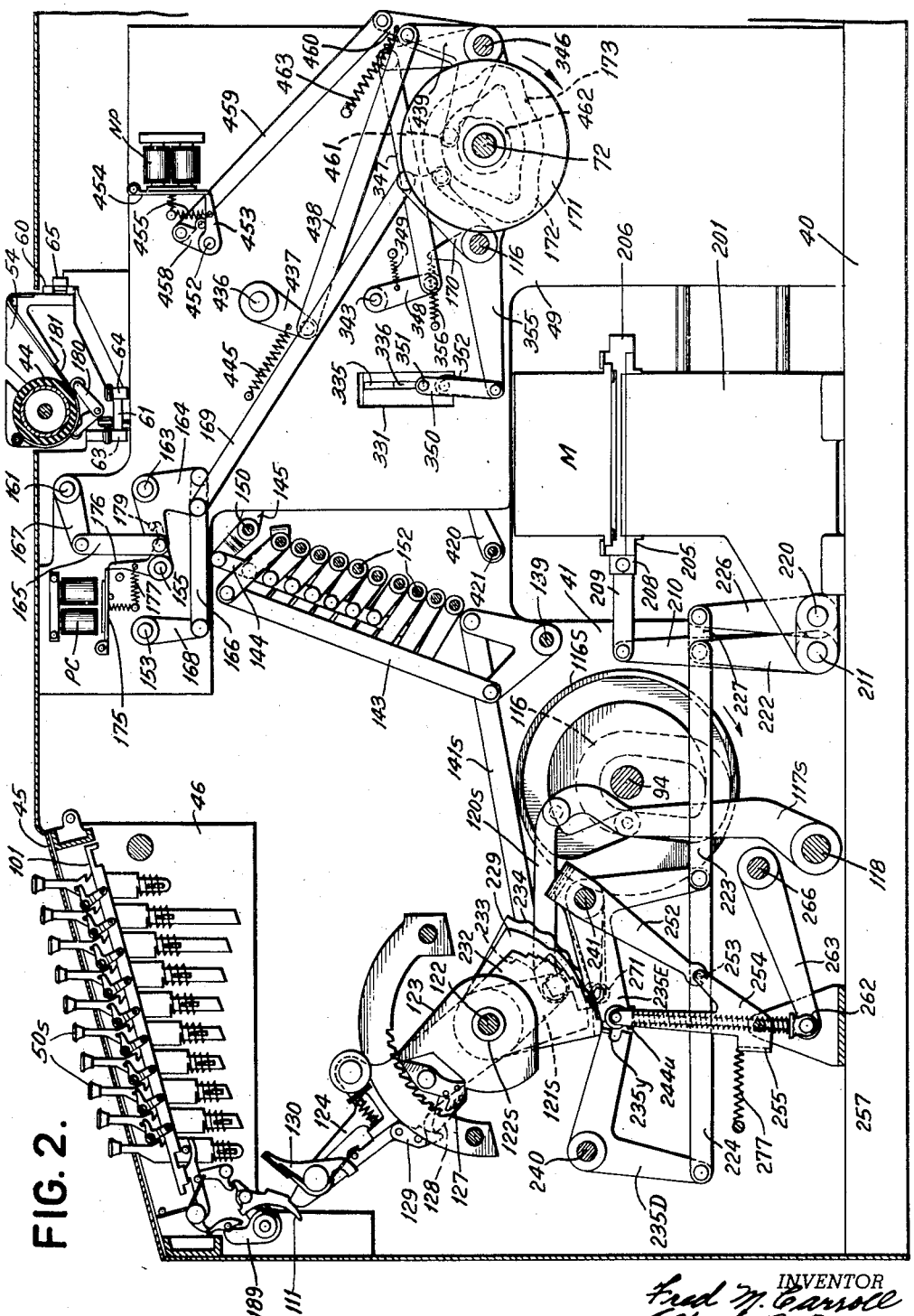
Fig. 2 is a sectional side elevation view taken through the selecting portion of the keyboard and showing the control mechanism for shifting the magazine.

Referring now to Figs. 2 and 4, shaft 94, which it will be recalled is driven directly from the main operating clutch, carries a box cam 116 having a groove into which extends a roller on a lever 117, the lever being pivoted on the end of a shaft 118. When shaft 94 rotates, the lever 117 moves first counterclockwise and then clockwise about its pivot 118. A link 120 (Fig. 1) is connected at the upper end of lever 117 and moves first to the left and then to the right. This link is pivoted on an arm 121 fixed to a rock shaft 122, rocking the latter. For each row of keys, a member 123 is provided on the rock shaft 122. Freely mounted on the shaft 122 for each bank of keys is a differential stop member 124 and also a member 125 connected to member 124 by a compression spring 126. The member 125 carries a pawl 127 having a cam arm 128 attached thereto and cooperating with a cam 129 on member 124. Spring 126 normally tends to force the member 125 counterclockwise with respect to the member 124, permitting the pawl 127 to drop into a notch in member 123 where it is held by the cooperation of the cam member 129 with the cam arm 128. As the shaft 122 with member 123 rocks clockwise, it will carry the members 124 and 125 along with it owing to the locking action of the pawl 127 with the member 123. The member 124 will thus move with the member 123 until member 124 meets an obstruction. Member 124 at its upper end carries a spring pressed dog 130 which travels across the path of the key shanks after a key is depressed. When this dog meets the depressed key shank, the movement of member 124 is stopped, that of 125 continuing and causing compression of the spring 126 whereupon the cam arm 128 moves along the cam member 129 permitting pawl 127 to be cammed out of the notch in member 123, owing to the angular relationship between the trailing edge of the notch and the angular end of pawl 127.

Pawl 127 thereupon moves to the stopping position with its nose entering a notch 135 in a fixed sector plate 136, and is locked there by the concentric surface 137 of member 123. It will be understood that the member 125 is moved to a position corresponding to the digit value of the depressed key and thereafter stopped and locked in this position until restored by the counterclockwise movement of the notched member 123.

Figure 6:
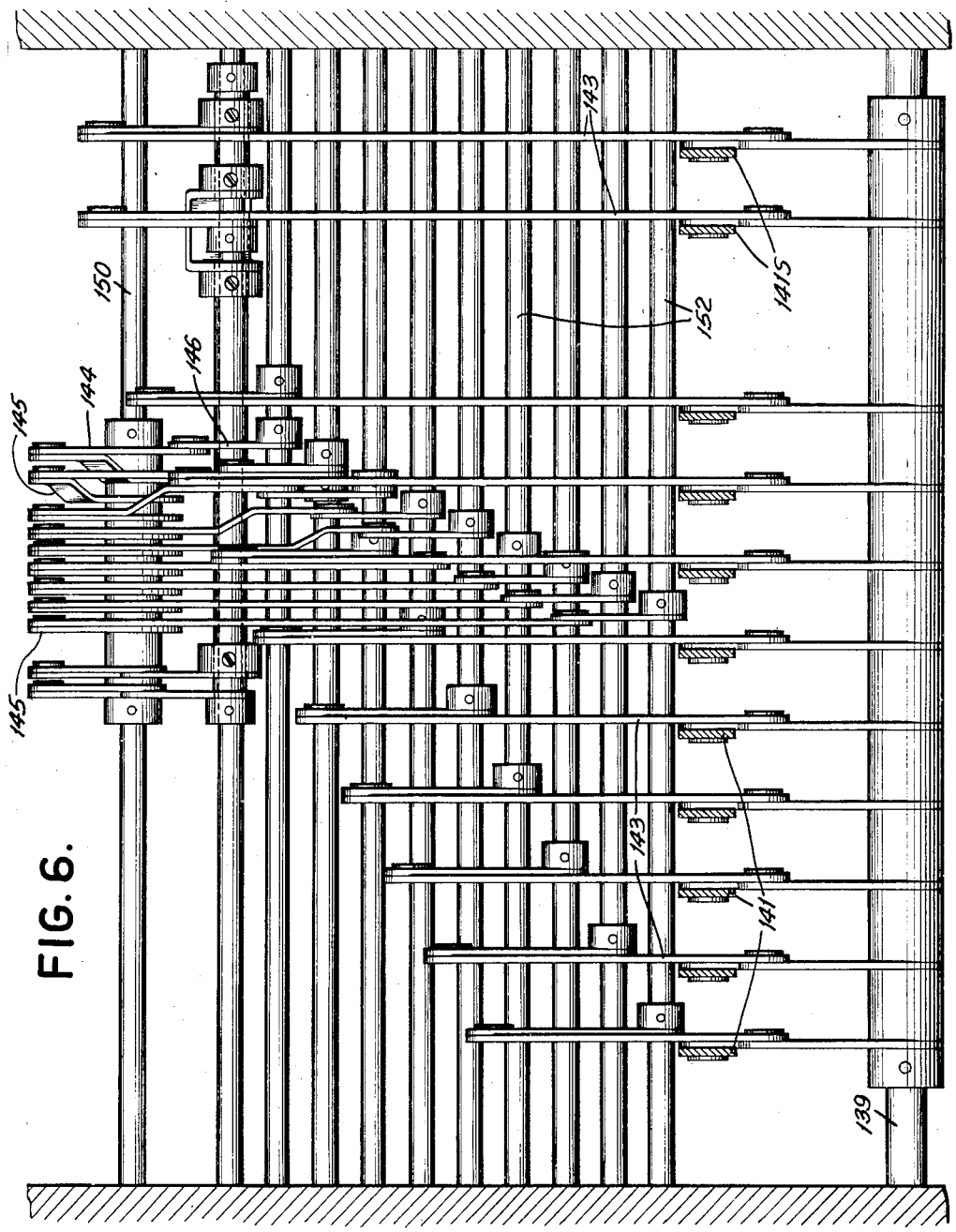
Fig. 6 is a detail elevation view of the shaft and crank connections between the keyboard and the type bars.

The members 124 and 125 are guided in their movement by a roll 138 coacting with the peripheral edge of sector 136. Member 125 is provided with an arm 140 to which is pivoted a link 141 whose upper end is pivoted to a bell crank 142 on a shaft 139. The bell crank 142 through linkage 143 and 146 rocks a shaft 152 through arms fixed thereto, and raises an operating lever 145 for lifting the operating rack or type bar 147 of the denominational order corresponding to the particular row of keys. One of the mechanisms just described is provided for each denominational order or bank of keys. As shown in Fig. 6, shafts 152 serve to connect the widely spaced differential operators to the closely spaced type bar lifters 145.

Figure 8:
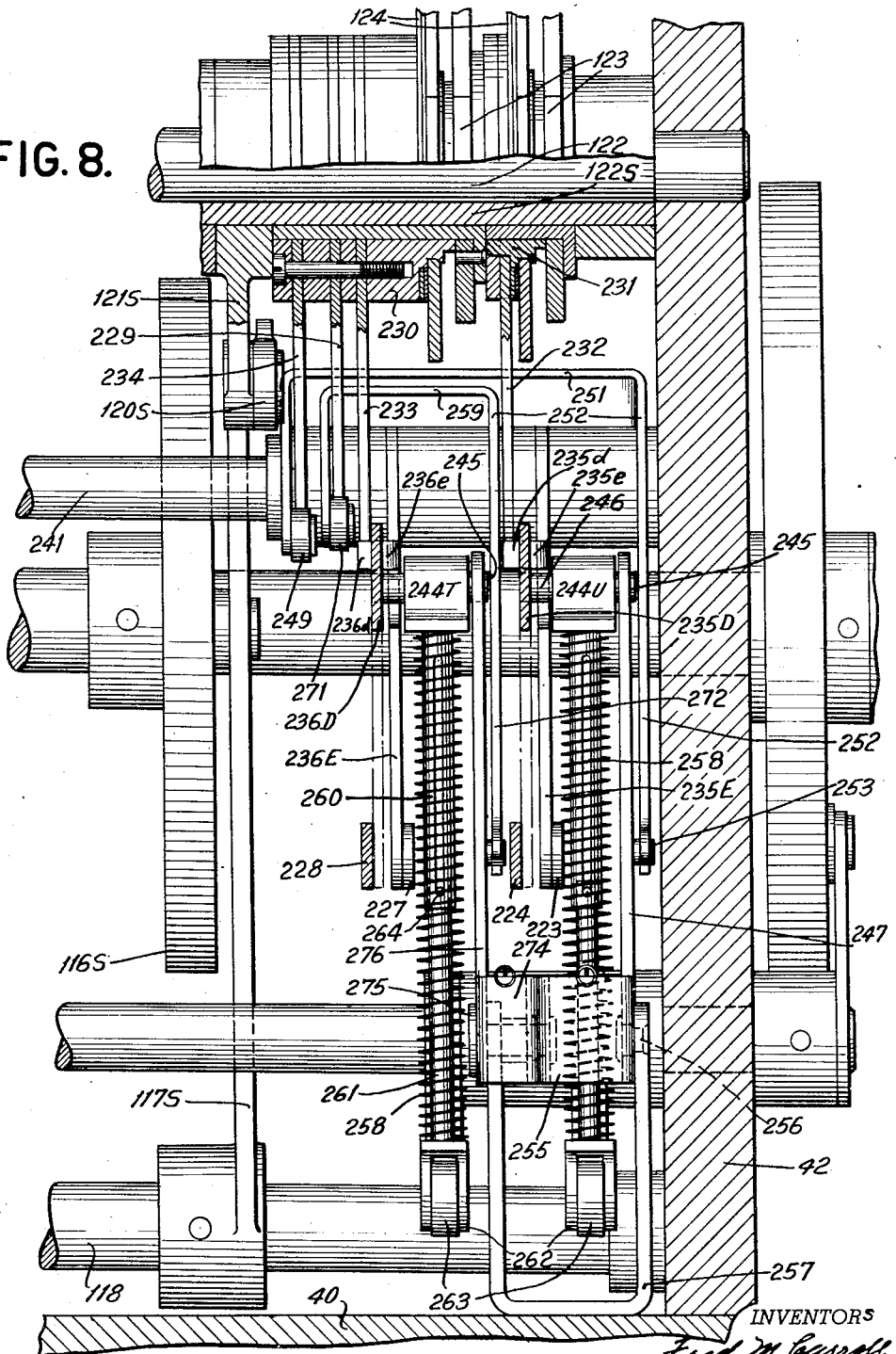
Fig. 8 is a front elevation view of the mechanism shown in Fig. 7.

A pair of similar key controlled differential mechanisms are provided to represent account numbers. As shown in Figs. 2 and 4, the two banks of number keys 50s are provided with release keys and locking bars 101. They also have differential mechanism similar to the amount differential but separately driven by two notched members 123 fixed to a tube 122s loose on shaft 122. In Fig. 8 it is seen that the two orders of account number differentials are at the right where the tube 122s is rocked by an arm 121s (Fig. 2) controlled independently of the amount entry control arm 121. A link 120s connects arm 121s to an operating lever 117s with a roller in the groove of face cam 116s. This cam 116s differs from amount operating cam 116 by having a longer dwell in the operated position which is used to hold the magazine in an adjusted position, so the selected storage device is available for a substantial portion of the operating cycle. Movement of the magazine is described hereinafter.

The account number differentials (Fig. 2) have a pair of links 141s which connect to linkages 142, 143, 146, 144 and 145 for adjusting a pair of type bars 147s the same as the amount type bars are adjusted. These two number printers are proportioned the same as the amount type bars 147 but they do not need carrying devices, nor are they affected by or effective over the storage unit sensing devices. The selected account number is printed at the left of the related entered and total amounts during listing and total printing cycles.

In addition to the nine amount printing bars 147 and the two account number printing bars 147s, the printer includes hammer impression members and tripping devices therefor. However, before describing the impression means, it is thought well to explain the type bar construction and operation.

The eleven type bars 147, 147s (Figs. 1, 12 and 12a) are guided at the lower end by the comb formation of bar 58. In this bar is a rod 83 which passes through slots 90 in the type bars to confine them further but allow them to move freely vertically. The other guide bars 56 and 57 (Fig. 1) also have combs for spacing the upper portions of the type bars.

In the upper end of each type bar are freely mounted two sets of ten horizontal digit type plungers 92. These plungers are constructed and operated in a well known manner and have type faces at the right opposite an inking ribbon and the platen 44. They slide horizontally in the bar and have small inner springs holding them toward the left from whence comes the operating blow by hammers 93 to cause the printing impressions.

In the normal position the type bars are lowered and resting on an end stop 96 fastened to the underside of a bar 59.

The twenty type plungers are arranged with the "0" type in the normal printing position at the top of the bar and the other nineteen plungers are arranged in numerical order, the digit numbers progressing down to the first "9" type, after which the second sequence of digits is started with a "0" type and the other nine digits are advanced progressively toward the center of the type bar.

The type bars are lifted by several actuating means, the first of which is, of course, the differential control from keyboard. This control is conveyed through lever 145 cooperating with a pin 97 extending from the side of the type bar. There are eleven such levers 145 each controlled by a bank of keys and rocked differentially according to which of the nine keys in a related bank is the one depressed. Counterclockwise rocking of levers 145 cause upward movement of type bars 147, 147s to the listing positions whereby an item entry may be recorded.

Coincident with the adjustment of the type bars, a set of retaining pawls 98 (Fig. 1) are operated to rock into cooperation with the upper portion of a set of rack teeth 99 cut in the side of each type bar. These pawls 98 are loosely pivoted on a shaft 100 and operated by a bail 106 (Fig.

12a) to which the pawls are attached by springs 105. The object of pawls 98 is to hold the type bars in their adjusted positions, while the differential levers 145 are restored.

Figure 20:
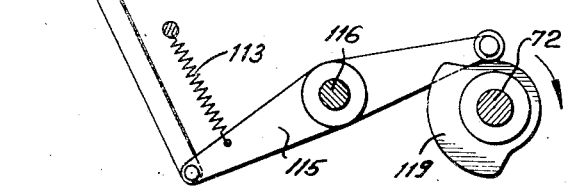
Fig. 20 is a detail view showing the cam and operating controls for latching the type bars to hold them in adjusted position.

The operating controls for timing the interval during which pawls 98 are effective are shown in Fig. 20. There it is seen that the bail shaft 100 has an arm 107 to which is articulated a link 114 which at its lower end is pivotally secured to an operating lever 115 loosely pivoted on shaft 116. A roller on one end of a lever 115 cooperates with a cam 119 secured to the cam shaft 72 which is rotated clockwise for each cycle of operation of the machine. A spring 113 holds the operating lever 115 in cooperation with cam 119 and, after a short interval of dwell, the cam rocks the lever in a counterclockwise direction to pull down the link 114, rock shaft 100 in a counterclockwise direction (Fig. 1) and turn bail 105 away from the tails on pawls 98 and allow them to rock into engagement with teeth 99 on the side of the type bars 147. A prolonged dwell on cam 119 (Fig. 20) allows the pawls to remain engaged during the time the type bars are adjusted for entry of item amounts and subsequent entry of old balance or stored amounts which are read from the storage devices. Shortly after the mid-point of the operating cycle, the pawls are disengaged so that the type bars are free to be restored downward to the home position.

In Fig. 1, it is noted that the rack teeth 99 on the side of the type bars extend along a substantial portion of its length. A large number of such teeth are required because they are used for purposes other than detenting in connection with pawls 98. As explained hereinafter, a carry mechanism cooperates with the type bars and lifts them through cooperation with the rack teeth. These carrying operations are required because other adjusting controls for advancing type bars also cooperate with certain of the rack teeth to lift the type bars for the entry of old balance or stored amounts. Before going further into the operation of the type bars for recording totals, it is believed well to explain how the printer is operated to record an item entry for listing.

Cooperating with print impression hammers 93 is a printing control mechanism for regulating the time of operation of the hammers and selecting the number of hammers to be released. Extending from the side of each type bar is a small pin 132 (Fig. 1) extending above a printing control latch lever 133 pivotally mounted on the lower end of a hammer detent 134. The front end of lever 133 is formed with a hook which is normally out of the path of an operating bail 149 secured to shaft 153. Overlying the series of levers 133 is a release bail 154 secured to a shaft 155. The mode of operation is such that, when printing is to be prevented, bail 154 maintains its position, holding levers 133 out of the path of latching bail 149 so that detents 134 hold the hammers 93 in a latched condition. However, normally the printing operation is allowed to take place and then bail 154 is rocked counterclockwise and allows levers 133 to follow pins 132 and cause operation under control of the lifted type bars. When a type bar is moved to represent a digit, lever 133 is rocked in a counterclockwise direction by its spring and brought into engagement with bail 149 which is operated at the printing time and rocked in a clockwise direction to pull all selected detents 134 and rock them in a clockwise direction to free the lower ends of hammers 93, so that they are thrown against the selected type 92 by hammer springs 156. Since the higher order type bars, which are not adjusted, fail to provide tripping connections, the hammers related thereto fail to operate against the zero type plungers. In those orders lower than the operated hammer, zeros are printed because there are offset extensions 157 formed on the arms of detent 134 to trip the detents of lower order hammers under control of detents in the upper orders representing significant digits.

The hammer springs 156 (Fig. 1) are normally collapsed but are attached to a bail 160 which is fastened to a shaft 161 and rocked clockwise to tension the springs for each printing operation. A means for restoring the hammers 93 is provided in the form of a bail 162 which is secured to shaft 163 upon which the hammers are free to rock.

Printing operations are controlled by a cam operated linkage shown in Fig. 2. There it is seen that the spring tensioning shaft 161, the detent tripping shaft 153 and the hammer restoring shaft 163 are all tied together with a linkage operated from a common source. A bell crank 164 is fastened to shaft 163 and two links 165 and 166 are articulated thereon. Link 165 is pivotally connected to an arm 167 on shaft 161 and link 166 is connected to an arm 168 fixed to shaft 153. Also pivoted on crank 164 is a long operating link 169, the lower end of which is articulated on an operating lever 170 loosely pivoted on shaft 116. On lever 170 is a roller in the cam groove of a face cam 171 fastened to shaft 72. This cam groove has two lobes 172 and 173, the first arranged to control listing or item printing, and the second lobe is designed to time printer operation for total printing. Both lobes serve to rock lever 170 in a counterclockwise direction, pushing up on link 169. Thus, crank 164 is rocked in a clockwise direction and shaft 163 rocks bail 162 (Fig. 1) away from the hammers. Through link 165 (Fig. 2) shaft 161 is also rocked clockwise and bail 160 (Fig. 1) is lifted to tension springs 156. Link 166 (Fig. 2) is pushed to the left and shaft 153 is also rocked clockwise (Fig. 1) to move bail 149 to the left and pull along all hooked detent release levers 133. Of course, all the mentioned printer controls are dependent for effectiveness upon the lifting of bail 154, because although they operate invariably printing does not take place unless levers 133 are free to be hooked to pull off the hammer detents 134.

Printing selection bail 154 is operated under control of the print control magnet PC (Fig. 2) which is energized selectively either early in the cycle under control of the listing key, or later in the cycle under control of the total taking key, or held deenergized for non-printing when the clear key is operated. When printer operation is selected, magnet PC is energized and the armature 175 is rocked upward counterclockwise. Cooperating with the right end of armature 175 is the top of a vertical arm on a release crank 176 fastened to bail shaft 155. A spring 177 tends to rock crank 176 counterclockwise and lift bail 154 (Fig. 1) for print selection, but the end of armature 175 prevents such movement until magnet PC is energized. Energization is timed to occur late in the upswing of linkage 164, 167 and 168 by either cam lobe 172 or 173 and after the hammer springs are tensioned, but before bail 149 passes the hooks on levers 133. Crank 176 is restored by a pin 179 on crank 164 overlying the horizontal arm and effective upon both returns to the home position by the printer linkage, to rock crank 176 in a clockwise direction and bring it to abut against the end of the dropped armature 175.

From the foregoing, it is apparent that the energization of magnet PC is selective and synchronized with the operation of either cam lobe 172 or 173 for selection of listing or total printing. Lobe 172 is spaced to be effective after the type bars have been lifted for item entry adjustment. Lobe 173 is delayed in its effect to allow time for the type bars to be adjusted for old balance and storage amount entry in addition to item entry, so that a total amount is recorded.

Later in each printing cycle, the record sheet is advanced by means of a line spacing mechanism cooperating with the shaft of the platen 44. This mechanism may be constructed as shown in Patent 1,950,480 and timed to occur after the second portion of the printing cycle, in order that spacing will follow the recording of a total. Also associated with platen 44 of Fig. 2 are the usual pressure roll devices 180 and the paper guide 181. As already explained, the paper carriage is movably attached to rectangular bars 61 and 65 by means of rollers through which the carriage can be adjusted laterally with respect to the machine.

Before explaining how the type bars are adjusted to take a reading from a storage device, it is believed well to explain how such storage devices are assembled in a magazine and how said magazine is arranged to be shifted under control of the two banks of account number keys to select one of one hundred storage devices.

Figure 9:
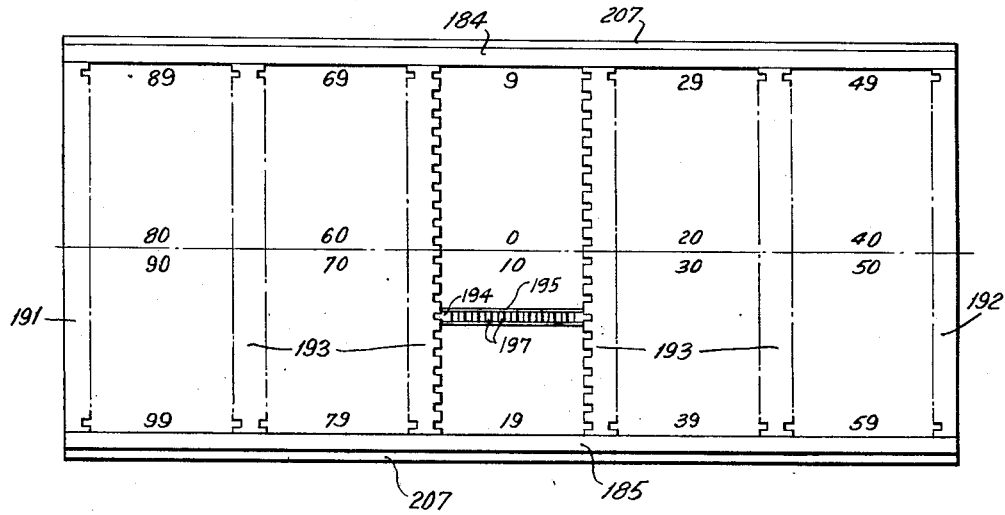
Fig. 9 is a diagrammatic plan view showing the identification and arrangement of the storage device frames within the magazine.
Figure 10:
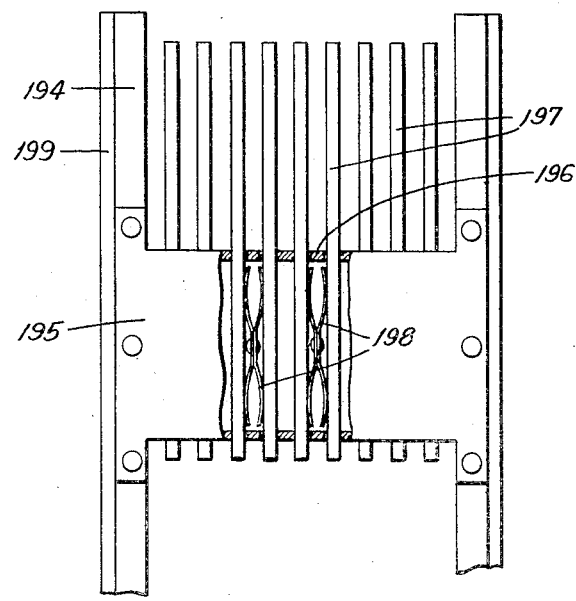
Fig. 10 is a sectional detail view showing the interior construction of an amount storage device.

Referring to the plan view of Fig. 9, an explanation of the arrangement of the magazine may be made in a general way. There it is seen that the magazine is constructed with a pair of end walls 184 and 185 between which is a pair of side walls 191 and 192 and four section separators 193. This construction results in the provision of five rectangular openings each containing twenty storage devices of the kind shown in Fig. 10. Each storage device is a flat rectangular unit made up with a pair of slidable side guides 194 tied together by a pair of thin spaced plates 195. One of the plates 195 is formed with a regular sequence of overturned lugs 196 to provide separate guide openings for a set of nine storage pins 197 slidably mounted and free for vertical adjustment. Between alternate pairs of said settable pins 197 are provided pairs of joined leaf springs 198 normally compressed between adjacent pins so that the pins are frictionally held against the sides of lugs 196. The side members 194 of the storage device have a vertical slide extension 199 which fits into grooves cut vertically in end pieces 191, 192 and the separators 193, Fig. 9. There are one hundred storage devices such as that shown in Fig. 10, and they are arranged to represent accounts or other statistical matter designated by the numbers shown in Fig. 9. There it is seen that the storage devices for accounts numbered 0-9 are arranged in the central section and range progressively from the center to the back of the magazine. The second group of storage devices representing accounts 10-19 are arranged to appear progressively starting at the middle of the center section and progressing towards the front part of the center section. It is also noted that the account storage devices designated by even numbers in the tens order are arranged in the rear of the five sections of the magazine. These are the accounts 0-9, 20-29, 40-49, 60-69, 80-89. It is also of importance to note that the accounts from 0-59 are grouped in the right section of the magazine while the remainder of the accounts relating to the storage devices identified as 60-99 are grouped to the left of the central position.

The magazine is moved in two directions in a horizontal plane to bring any one of the ninety-nine storage units, other than that at the zero position, into the zero position where the selected storage unit is raised to cooperate with the type bars. The storage unit at the centralized zero position is the one that is raised to influence the setting of the type bars and in turn be adjusted by the type bars.

Before describing the manner in which the account number keys control the movement of the magazine, the manner of mounting the magazine for such movement will be pointed out.

The magazine shifting mechanism is mounted between and on a pair of support frames 200 and 201 (Figs. 2 and 11) fastened to base 40. The magazine is mounted on top of these two frames 200 and 201 and connected thereto in such a manner that it is movable in both directions, laterally and longitudinally, for selection of a particular storage device. In order that the magazine may be free for movement back and forth longitudinally within the machine, the tops of the two frames are notched with a horizontal groove cut into the inside walls of the frames. In Fig. 11, it is seen that a pair of rails 202 and 203 are movable along the guide notches and held down on the frames by locking plates 204. The rails 202 and 203 are attached to a pair of end guide members 205 and 206 which also act as ways for the magazine to be guided in a lateral direction as best shown in Fig. 1. There it is seen that the end plates 184, 185 of the magazine are formed with extending feet 207 projecting into horizontal grooves cut into the upper part of the ways 205 and 206. Cover plate 208 holds the magazine down on the end pieces but it is free for lateral movement thereon. From the foregoing, it is obvious that the entire magazine unit M is held elevated above the supporting frames 200 and 201 but free for movement relative thereto in a longitudinal direction by movement along grooves by rails 202 and 203 and also free for lateral movement because feet 207 (Fig. 1) are free to slide from side to side in the end pieces 205 and 206.

Figure 5:
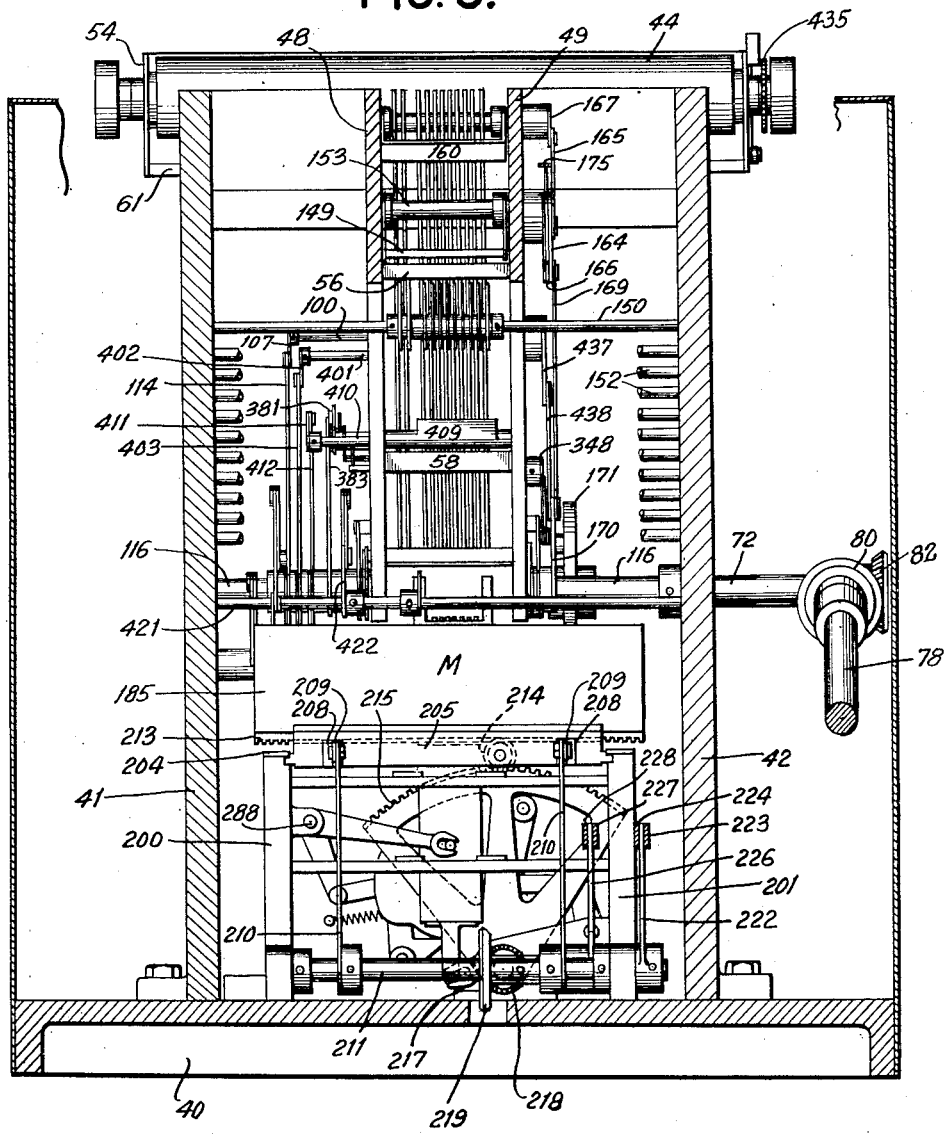
Fig. 5 is a sectional elevation view taken through the center of the machine as observed from the front. It shows the magazine adjustment mechanism and the type bar arrangement.

A portion of mechanism for controlling the longitudinal adjustment of the magazine is best shown in Figs. 1, and 5. There it is seen that the front end piece 205 is formed with a pair of extensions 208 having pivot centers on which a pair of links 209 are attached. The front ends of these links 209 are articulated on the top of a pair of levers 210 attached to a shaft 211 loosely mounted in the supporting frames 200 and 201. The connections for control of longitudinal movement of the magazine are carried further forward to be placed under control of the account number keys as described hereinafter.

Figure 7:
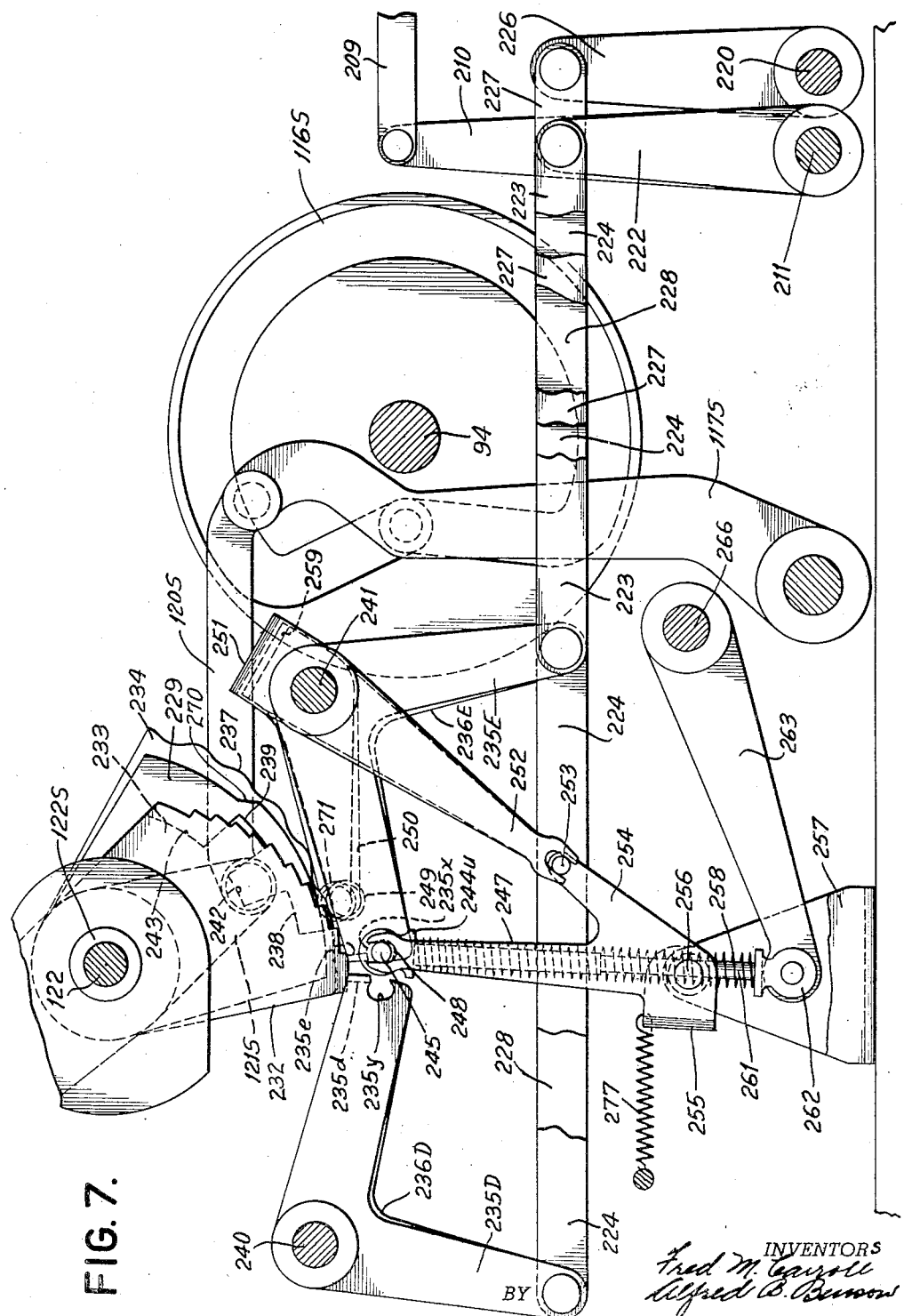
Fig. 7 is an enlarged elevation view of the cam mechanism for positioning the magazine.

Turning now to the part of the mechanism for controlling the lateral movement of the magazine, it is seen in Figs. 1 and 11 that a pair of racks 213 are secured to the underside of the magazine and placed beneath the end walls 184, 185. Cooperating with both of these racks 213 is a long pinion 214 extending between the end guides 205 and 206 and pivoted therein. Cooperating with pinion 214 is a sector 215 fastened to a longitudinal shaft 216. This shaft is supported by a pair of bearing blocks 217 fastened to the base 40, and it carries a bevel gear 218 in mesh with a bevel toothed sector 219 attached to a lateral shaft 220. Shaft 220 is parallel to the other adjusting shaft 211 and is also mounted between the supporting frames 200 and 201. Both of these adjusting shafts carry vertical arms for receiving movement from the keyboard controls. In Figs. 2 and 5, it is seen that the right end of shaft 211 carries a vertical arm 222 upon which is pivoted a pair of links 223 and 224 for receiving movement as controlled by the units order bank of account number keys. The other control shaft 220 has a similar operating connection in the form of an arm 225 to which is pivoted a pair of links 227 and 228 for controlling the lateral movement of the magazine by the tens order bank of account number keys. These pairs of links 223, 224 and 227, 228 are shifted horizontally in different directions to vary the position of the magazine. When observed as shown in Figs. 2 and 7, link 223 is moved one of nine differential steps towards the left to control the selection of one of ten storage devices in one of the rear sections of the magazine. The companion link 224 is operated towards the right for one of nine different distances to shift the magazine for selection of the storage devices in the front half of the magazine. The other two links 227 and 228 control the lateral adjustment of the magazine in either of the two directions for one or two steps of movement in either direction.

Link 227 moves towards the left (Fig. 2) to elevate the bevel toothed sector 219 (Fig. 1) and rotate shaft 216 (Fig. 11) in a clockwise direction, so that the magazine is shifted towards the left for one or two steps of motion to select any one of the sections containing storage devices for accounts numbered 20 to 59 inclusive. When link 228 is operated, it pushes towards the right (Fig. 2) and depresses the beveled sector 219 (Fig. 1), so that shaft 216 (Fig. 11) is rocked counterclockwise and shifts the magazine towards the right to select account storage devices relating to the higher numbered accounts 60–99. These magazine adjusting links 223 and 224 are selectively operated according to whether the entered account number is even or odd in the tens order, and one of the links 227 and 228 is selected according to whether the tens number is or is not larger than 5. Only one of the pair of links 223, 224 and one of the pair 227 and 228 are active at one time, the other ineffective links following along to partake of the movement because they are connected to the active links.

The normal position of the parts is arranged to consider account numbers which are even in the tens order and then link 223 is active to control magazine adjustment. From Fig. 9 it is apparent under such conditions selection is made in the rear half of the magazine. When odd numbered accounts of the tens order are set up on the account keyboard, the other link 224 becomes effective and it selects a storage device in the front half of the magazine. One or the other of links 227 or 228 is operated to position the magazine laterally to the left or right, depending on the tens order number being either below 6 or greater than 5. In Fig. 9 it is seen that the reason for this is in the grouping of the lower numbered accounts at the right and the higher numbered accounts at the left. Before going into the manner in which the four links are operated, it is believed well to describe the connections as they extend from the differential devices cooperating with the two banks of keys relating to the account numbers.

It is pointed out hereinbefore with reference to Fig. 1 that, when the amount keys are depressed, a differential member 124 is rocked clockwise to one of nine different extents to represent the digit set up. In a similar way the account number keys 50s (Fig. 2) control the setting of a pair of differential levers 124 shown in Fig. 8. In this view, the tens order differential member 124 shown at the left is connected to a hub 230 and the units order differential is secured to a hub 231. Fastened to the units order hub 231 is a control sector 232 for controlling the back-and-forth or longitudinal movement of the magazine. Secured to the other hub 230 of the tens order is a set of three sectors 229, 233 and 234 which are used not only to determine the size and odd and even condition of the account number, but also for controlling lateral movement of the magazine.

The contours of these account selecting members 229, 232, 233 and 234 are shown in Fig. 7. There it is noted that the units order sector 232 is formed with a graduated stepped outline with the normal zero position projecting the greatest distance away from the center shaft 122. All the other differential digit positions are in regular steps and progressively shortened to provide a longer throw for the cooperating adjusting devices.

The three tens order sectors 229, 233 and 234 are shaped in different forms to control the adjusting devices according to the amount of the tens order digit and according to the odd or even nature of the tens digit. Sector 229 has an extended arcuate edge on which rests a roller 271 in the home position. There is a drop 270 to a lower level between the "5" and "6" number positions. Roller 271 is on a bail 259 (Fig. 8) with a long depending arm 272 that controls the left or right shifting of the magazine. The sector 234 is seen to have a wave-shaped contour 237 with the high points of the wave formation representing even digits and the low points representing the odd digits. The zero position of this sector 234 is indicated by the position of a cooperating roller 249 mounted on an arm 250 of a bail 251 pivoted with bail 259 on a shaft 241. The contour of the sector at the zero position is extended, as are the wave projections at the 2, 4, 6 and 8 positions, to hold arm 250 rocked in a counterclockwise direction. The arm 250 is urged in a clockwise direction and upon the setting of the tens order differential to an odd number the bail 251 is rocked clockwise to shift the magazine moving controls for directional control opposite to normal as explained hereinafter.

The third tens order sector 233 is cut out with a pair of depressions 242, 243 and a pair of shoulders 238, 239. These shoulders 238 and 239 are at the same level and are presented for control when the sector is representative of the digits 2, 3, and 6, 7, the other deeper notches 242 and 243 are representative of digits 4, 5, and 8, 9, respectively. The reason for the arrangement of these notches is more apparent by reference to Fig. 9, where it is seen that the storage sections 20–39 and 60–79 are equidistant from the center point, the former being to the right and the latter to the left. In the same way the two side sections of the magazine are equidistant from the center or normal position, the only difference being the counts storage devices, or the accounts numbered 40–59 are two steps to the right while the accounts numbered 80–99 are at the left and two steps away from the normal 0 position. Sector 233 is the control for determining the distance of one or two steps of shifting of the magazine to the right or to the left according to the size of the account number digit in the tens order.

Considering first the control effected by the position of the units-order sector 232, it is noted in Fig. 7 that there are two bell cranks 235D and 235E having offset lugs 235d and 235e underlying the normal zero shoulder on the sector. The one crank is loosely pivoted on a cross-shaft 240 and the other is freely mounted on the shaft 241. Connected to the vertical arms of the cranks are the links 223 and 224 already mentioned, link 223 pivoted on right crank 235E and link 224 articulated on crank 235D. When the cranks are in the normal position as shown, the magazine is located to select the centralized zero storage device. Upon movement of the units order account number differential to a selected digit position, the sector 232 is rocked clockwise and one of the other steps thereon is placed above the lugs 235d, 235e so that one or the other of the cranks is regulated in their movement towards the step. However, before either of the units order cranks is moved to sense the setting of the units sector, a selection is made between the two cranks to determine which is to be the effective one. This selection is brought about under control of the tens order sector 234 in a manner about to be described.

Cooperating with the wave-shaped contour 237 of sector 234 is the roller 249 on arm 250 as already explained. This arm 250 is part of a bail 251 pivoted on shaft 241 and having a downwardly extending arm 252. This last mentioned arm is connected through pin and slot connection 253 with an extension 254 forming part of a bail 255 pivoted at 256 on a bearing bracket 257 fastened to the base 40. A spring 277 (Fig. 7) tends to rock bail 255 counterclockwise and hold roller 249 against sector 234. Extending upwardly from bail 255 is an arm 247 engaging a pin 245 within an open ended slot 248 formed in the top of the arm. This pin 245 (Fig. 8) projects to the right of a connecting block 244U which has another pin 246 extending towards the left. Pin 246 is arranged to cooperate with one or the other of a pair of openings 235x or 235y in arms 235E and 235D, respectively. These openings or slots are slightly hook-shaped to retain the pin therein during crank operation. As the parts are shown in the normal position, connecting block 244U is positioned at the right (Fig. 7) to engage the block with the opening 235x so that crank 235E is made effective by operation of a compression spring 258 which is pressed upwardly against block 244U at the proper time in the magazine adjusting part of the operating cycle.

Block 244U assumes the position shown whenever the tens order sector 234 is at 0 or moved to an even numbered digit position. Whenever the sector assumes a position indicative of an odd number, bail 251 is rocked clockwise (Fig. 7) and through arms 252, 254 and 247 block 244U is shifted to the left (Fig. 7), so that the pin projecting from the block is engaged with opening 235y and bell crank 235D is called into operation.

A similar form of construction is provided in the tens order with a pair of bell cranks 236E, 236D (Fig. 8) having lugs 236e and 236d cooperating with the sector 233. These tens order cranks are also selectively connected by a block 244T. However, block 244T is moved by a separate bail 274 which is pivoted on a stud 275 fixed to bearing bracket 257. The long notched arm 276 of bail 274 engages block 244T and has a pin and slot connection with the arm 272 of bail 259 with the roller 271 (Fig. 7) cooperating with sector 229. These connections make it possible to shift operation control from crank 236E to crank 236D and change the direction of lateral magazine shift when an account number is larger than 59. Associated with the tens order selection block 244T is a second compression spring 258 and a duplicated mechanism for operating it along with the operation of the compression spring for the units order.

The compression mechanism cooperating with the two blocks 244U and 244T is best shown in Fig. 8. There it is noted that each block has integral therewith a downwardly extending sleeve 260 in which there slides a guide rod 261. The bottom end of each rod 261 is fastened to a U-shaped strap 262 which is pivoted on the end of an operating arm 263. Extending from the top of rod 261 is a small pin 264 extending through a long slot in the sleeve 260. This serves to provide a telescopic restoring connection between the connecting block 244T at the top and the strap 262 at the bottom. The compression spring 258 is assembled over the rod 261 and sleeve 260 and presses between the block and the strap. Normally, there is little or no pressure exerted by these springs 258. However, after the blocks have been positioned according to the size and odd or even condition of the selected account number, and after the account numbers sectors have been adjusted, arms 263 (Fig. 7) are rocked in a clockwise direction to compress the springs and urge the bell cranks 235E or 235D and 236E or 236D to move so that the lugs thereon are brought up against the selected shoulders on the sectors. Thus, there is provided a flexible operator for the magazine.

The pressure arms 263 are fastened to a shaft 266 (Fig. 3) which extends outside the right side frame 42 and carries an operating arm 267. On the end of arm 267 is a roller cooperating with the groove 268 of a face cam 269 which is fastened to the main operating shaft 94. The cam is shaped to allow time for adjustment of the account number differentials under control of the keyboard and then it becomes effective to rock arm 267 in a clockwise direction. Referring again to Fig. 7, it is seen that operation of shaft 266 in this direction causes arms 263 to raise the straps 262 and compress the springs 258.

Late in each cycle, cam 269 (Fig. 3) restores shaft 266 and then pins 264 (Fig. 8) are drawn down to lower blocks 244U and 244T positively, and restore the connected bell cranks 235D or 236D and 235E or 236E and the connected magazine.

The different kinds of operation controlled by the account number selecting devices for shifting the magazine may be explained by taking typical examples involving odd and even numbers and small or large numbers. Assuming first that the account involved is identified by an even number in the tens order, then the two connecting blocks 244U and 244T remain in the position shown in Fig. 7. Then the units order crank 235E is effective and, when the spring 258 is compressed, this crank rocks in a clockwise direction to an extent determined by the setting of units sector 232. When the crank is so rocked, the connected link 223 is pulled towards the left (Fig. 2) and by rocking levers 222 and 210 in the same direction the magazine is pulled toward the front of the machine one of nine steps according to the value of the units order digit.

Should the account number involve an odd number in the tens order, then the units order connection block 244U (Fig. 7) is shifted to the left to put crank 235D into operation for controlling the magazine movement backward. This is accomplished when spring 258 presses through block 244U and rocks the crank in a counterclockwise direction to bring the lug 235d against the stepped shoulder on the units sector 232. Connected to crank 235D is the other link 224 which is also secured to operate arm 222 (Fig. 2) but, when this link 224 is operated, it is moved to the right and carries along therewith levers 222 and 210 to shift the connected magazine towards the rear of the machine. Of course, while one or the other of the cranks is operating, the other is oscillated by means of the linkage connections but, since the direction of oscillation is away from the control sector, there is no interference with the operation.

Referring to Fig. 9, and remembering that the zero storage device is the one normally standing over the account unit selecting position, it is apparent that the movements of the magazine described in the foregoing sections are correct for controlling the longitudinal positioning of the magazine. It is remembered that the even numbered account numbers called for movement of the magazine toward the front of the machine, and in Fig. 9 it is seen that all the even numbered account units 0–9, 20–29, 40–49, 60–69 and 80–89 are situated at the rear of the magazine and they are made accessible by a forward movement of the frame. Since the other account units relating to the numbers having odd numbers in the tens order are situated at the front of the magazine, they are reached for selection by a rearward movement of the magazine under control of the units order devices when a shift of connection has been made from crank 235E (Fig. 7) to crank 235D.

From the foregoing it is noted that the direction of the longitudinal magazine movement is selected by selector 234 and the extent of longitudinal movement is controlled by stepped sector 232. Attention may now be given to the devices for controlling side-to-side movement of the magazine for selection of the eight account groups located to the left and right of the 0–9 and 10–29 groups (Fig. 9) in the center of the magazine.

Turning now to the control of the tens order lateral shifting mechanism, it is seen to operate in the same fashion as the units shifting control mechanism with the exception that directional control is governed by the sector 229 (Fig. 7) with the cam drop 270, and control over degree of movement is exercised by the sector 233 with the shoulders and notches 238, 239, 242 and 243. Assuming that the selected account number is less than "6" in the tens order, then the tens order crank 236E is effective because the connecting block 244T remains in the normal position. Then, if the account number is in the 20's, the lug 236e is brought upward against shoulder 238 and the crank 236E is rocked one step in a clockwise direction. When so moved, the crank pulls the connected link 227 toward the left and rocks the connected arm 226 (Fig. 2), and shaft 229 in a counterclockwise direction. Turning to Fig. 1, it is seen that the bevel gear sector 219 is rocked upward and shaft 216 (Fig. 11) is turned clockwise so that pinion 214 is revolved counterclockwise and operates rack 213 to shift the magazine toward the left one section width (Fig. 9) to present the section containing the storage units 20–29 inclusive under the selecting position. A greater extent of movement in the same direction is effective to select the accounts numbered 40–49 inclusive, when the deep step 242 (Fig. 7) is placed beneath the lug on crank 236E and, since it is twice the depth of the shoulder 238, it has the effect desired. The same lateral movements when selective of accounts 30–39 or 50–59 are combined with a rearward longitudinal movement of the magazine, because of the effect of the odd tens digit and sector 234 to select link 224 as already explained.

For movement in the opposite direction (that is, when the account number is "6" or larger in the tens order), the block 244T (Fig. 8) is shifted because bail 259 (Fig. 7) rocks, due to cam face 270, and bail 274 also rocks to engage crank 236D and make lug 236d effective in cooperation with the shoulders on sector 233. Then counterclockwise movement of the bell crank is imparted to the connected link 228, which is also pivotally attached to operating arm 226 (Fig. 2) and operative through the bevel gearing for shifting the magazine towards the right of the machine so that the higher numbered sections 60–99 (Fig. 9) at the left in the magazine are presented for selection under the type bars.

Since the units order magazine moving devices are independently operable to determine the longitudinal movement of the magazine, it is only necessary for the tens order shifting controls to move the magazine to the left or right one of two distances and then, in the selected section containing twenty different storage units, the units order movement becomes effective back or forth to select one of the twenty. All selecting movements are combined motions in radiating directions through the center of the magazine. Thus, it is possible to make a comparatively large number of selections by short direct movements.

After the magazine M has been moved to select a storage device, a plunger is lifted to elevate the selected device as shown in Fig. 11, where the central holder 194, 195 is raised for reading of stored data. The raising plunger is located in a position (Fig. 9) underlying that normally occupied by the "0" storage device. The plunger is fixed in position except for vertical movement. In other words, the ninety-nine different selective movements of the magazine are made relative to the top of the plunger which remains depressed until the magazine is fully adjusted.

In Figs. 1 and 11, the plunger or storage unit selector 280 is seen to be in the shape of a long rectangular sleeve, supported for vertical sliding movement by pairs of comb plates 281 and 282 secured to the tops of cross-bars 283 and 284 fastened between the storage mechanism frames 200 and 201. In the normal position of adjustment, plunger sleeve 280 projects above the top of combs 281 but below the bottom edges of the magazine section separators 193. The dotted line 280a (Fig. 11) shows the fully operated position.

For the purpose of raising and lowering the sleeve, an arm 286 cooperates therewith through a pin and slot connection 287. Arm 286 is fastened near the front end of a shaft 288, which end is supported by a bearing boss 289 on frame 200. The rear end of shaft 288 (Fig. 1) is supported by a bearing in bracket 88. Near the rear end is fastened another arm 291 connected by a link 292 (Fig. 11) to a bell crank 293 pivoted at 294 on bracket 88. The horizontal arm of crank 293 carries a follower roller 295 cooperating with a cam 296 fastened to the short shaft 91 (Fig. 1), which is rotated clockwise (Fig. 11) for each cycle of operation of the machine, as mentioned hereinbefore. The cam is proportioned to permit the plunger to remain lowered while the keyboard differential is actuated and while the magazine is shifted. It is held in its normal condition by a spring 297 (Fig. 11) tending to pull the crank in a counterclockwise direction. However, after the proper interval, a raised cam face strikes roller 295 and rocks the bell crank in a clockwise direction and, through the linkage 292, arm 291 and shaft 288, the operating arm 286 is rocked counterclockwise to lift the sleeve 280 and project the selected storage device above the top surface of the magazine.

The cam is formed with a concentric raised surface to hold the storage unit elevated for a substantial portion of the operating cycle. It is during this portion of the cycle that the reading is taken of the amount data stored in the unit and communicated to the type bars.

After the storage unit has been read and restored and receives a new entry, the storage device is lowered before the magazine is restored to the normal zero position. For this reason the cam 296 is formed to allow restoring movement before the end of the cycle, as directed under the tension of spring 297.

During the time that the selected storage device is elevated and after the reading has been taken from the adjusted pins 197, it is necessary to restore all the selected pins 197 to a normal elevated zero position before a new reading or setting is made by subsequent adjustment of the pins. For the purpose of restoring the pins of the storage unit, the sleeve 280 is fitted with an inner rectangular bar or restoring plate 300 slidably mounted within the sleeve. Restoring plate 300 is adjusted independently of the surrounding sleeve. As part of the adjusting connections, it is formed with a depending extension 301 carrying a pin 302 comprising one member of a pin and slot connection with an operating arm 303. This arm 303 is fastened near the front end of a shaft 304 supported by a bearing projection 305 extending inside the frame 201. Shaft 304 (Fig. 1) extends toward the rear of the machine and is supported by the bracket 88. Adjacent the bracket is fastened an arm 306 (Fig. 11), with one end fastened to the shaft 304 and the other articulated with a link 307, the inner end of which is pivoted on an arm 308 pivoted at 309 on bracket 88. The connection between link 307 and arm 308 is provided with a follower roller 310 cooperating with a cam 311 also secured to the short operating shaft 91. Spring 313 is fastened to arm 306 and tends to hold the plate lifting linkage in cooperation with cam 311.

In the normal position of the parts, restoring plate 300 is lowered so that its upper edge is substantially coincident with the upper part of sleeve 280. The plate remains lowered for a short time after the sleeve is raised, and it is during this period that a reading is taken of the setting of the pins in the selected storage device. However, after the reading has been taken, the pins can be restored, and then the plate 300 is raised to push the pins 197 of the selected unit upward into the normal zero position. As the projection on cam 311 strikes roller 310 (Fig. 11), link 307 is pushed to the right, and shaft 304 is rocked clockwise and arm 303 follows along to raise the restoring plate 300 for a short period of time. As soon as the extension on the cam passes roller 310, spring 313 comes into effect and rocks shaft 304 back in a counterclockwise direction and lowers the plate 300. When the restoring plate is lowered, the pins 197 are free to be depressed lower than the zero position, and this is done by devices controlled by the total reading on the elevated type bars.

The position in which the selected storage device is elevated is directly beneath the set of amount printing type bars 147 (Fig. 1). Between the storage setting pins 197 and the type bars is provided an amount sensing device which reads the data represented by the setting of the pins and operates the type bars accordingly to add the stored amount. Not only is the sensing device effective to transfer amounts from the storage unit to the type bars, but it is also effective in reverse to take a reading of the type bars (such as a new balance amount) and transfer said reading into the selected storage device by setting the pins therein. The sequence of operation is such that an item amount is first entered in the type bars, a storage device is selected, the stored amount is transferred and added to the item amount by further adjustment of the type bars, the settable pins of the selected storage device are reset to zero, and, as the type bars are reset, the total amount is transferred to the storage device. Of course, there are variations of the mentioned sequence when no item is added, when no old balance is present in the storage unit, or when clearing operation is selected to restore the storage device before type bar restoration.

Figure 12A:
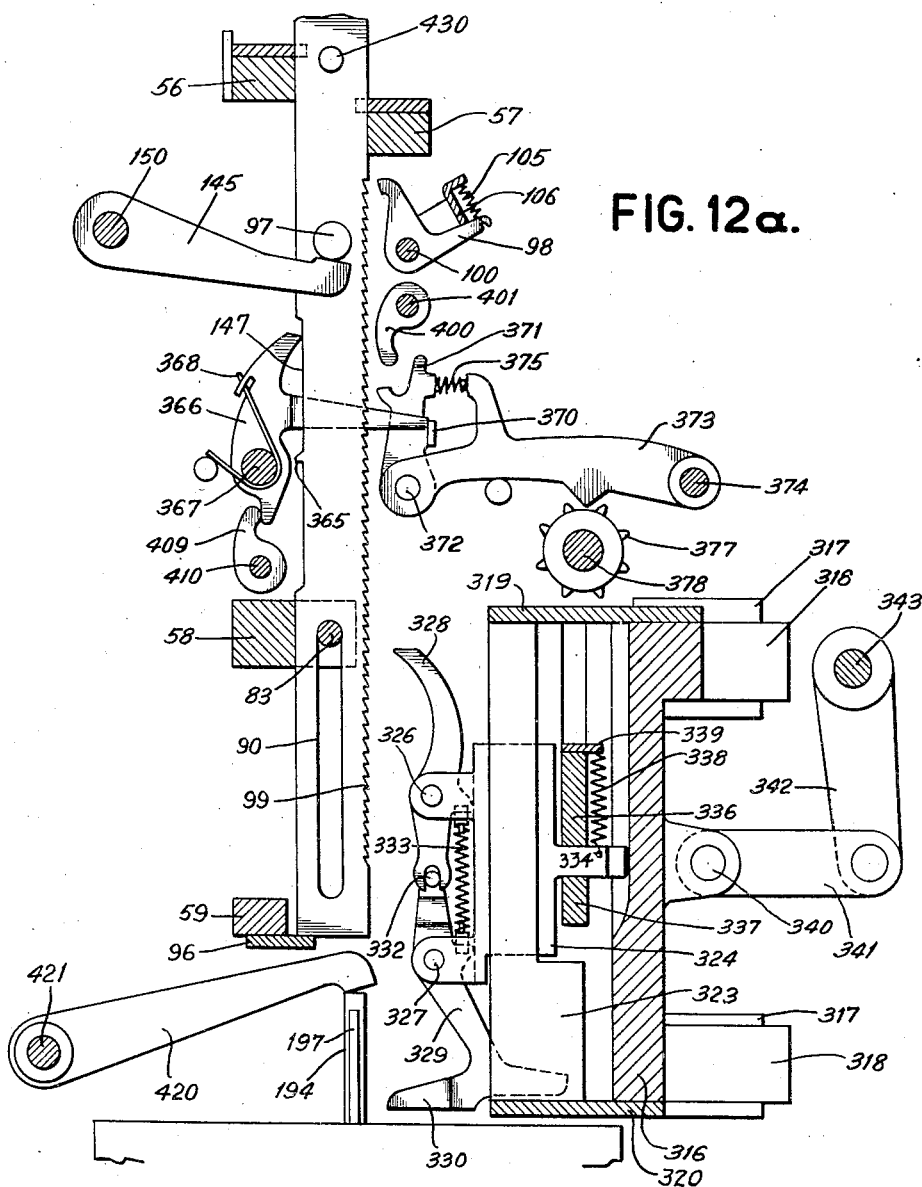
Fig. 12a is an enlarged elevation view showing the carrying and amount sensing mechanisms in cooperation with a type bar.

Referring to Figs. 1, 11, 12 and 12a, it is seen that the data sensing devices are mounted in a strong channel-shaped frame 316 which is guided for horizontal movement by four pairs of rails 317 projecting inwardly from frames 48 and 49. Extending from frame 316 are four shouldered ribs 318 (Fig. 11) fitted between the pairs of rails 317 and spaced at the upper and lower edges of the frame to hold it securely between the intermediate side frames. Fastened to frame 316 are upper and lower end plates 319 and 320. Fixed between the end plates and evenly spaced are a set of spaced vertical guide posts 323. Slidably mounted between adjacent pairs of the posts is a reciprocating frame 324 for carrying sensing and amount transfer pawls. There is one such frame for each order or denomination and they are aligned with the amount type bars 147 as seen in Fig. 12. Both sides of each frame 324 are formed with vertical indentations to fit it between the posts and hold it firmly but free for vertical reciprocation.

Extending forwardly from each frame 324 is a pair of slotted ears 326 and 327 which have pivots for a pawl 328 and sensing lever 329 carried thereby. Since the ears are aligned vertically, the related pawl and lever are also aligned, with the pawl 328 situated opposite teeth 99 in a type bar 147, and a sensing foot 330 of lever 329 opposite a related storage setting pin 197.

Each related pair of pawls 328 and levers 329 is connected by a pin and slot connection 332, and they have further connection in the form of a compression spring 333 tending to move the pawl 328 toward the type bar, and rocking lever 329 so that foot 330 approaches the storage pin. However, the pawls are balanced in vertical alignment, and the main frame 316 is normally retracted, so that the pawls are normally located, as shown in Figs. 1 and 12a, to the right and out of operating association with the storage pins and type bars.

Each reciprocating frame 324 is formed with a rearwardly extending plug 334 through which the parts are raised and lowered. Overlying all the lugs 334 is an upper restoring bar 336 extending across the sensing unit (Fig. 11) and formed with a pair of reduced ends extending through vertical slots cut through both the sensing frame 316 and the intermediate side frames 48 and 49. Mounted in a similar fashion is another restoring cross-bar 337 underlying all the lugs 334 and extending outside the intermediate frames for operating control. Springs 338 are connected between lugs 334 and a catch plate 339 fastened to the top of bail 336. The rear ends of lugs 334 extend into vertical notches cut into the rear wall of the channel frame 316 as seen in Fig. 12. Therefore, each denominational frame 324 is guided between a pair of posts 323 and the vertical notch in the frame.

In the normal position of the parts (Fig. 12a), frame 316 is retracted toward the rear of the machine and both bail bars 336 and 337 are lowered so that the feet 330 of the sensing lever 329 are located directly above the upper surface of the magazine and directly opposite the upwardly projecting pins 197 of the selected storage device.

The sequence of sensing control involves movement of the sensing frame toward the front of the machine to put the pawls into operation, and then lifting movement of the operating bails to transfer amounts to the type bars followed by downward movement of the bails to reset the sensing devices after transfer of amounts from the type bars to the storage device, and further restoration of the entire unit toward the rear of the machine.

Considering first the horizontal movement of the sensing device, it is noted that the rear of frame 316 (Fig. 12) is formed with a pair of pivot extensions 340, between which is articulated one end of a link 341. The rear end of the link is pivoted on the lower end of an arm 342 secured to a shaft 343 (Fig. 14) which passes outside the intermediate frames and has linkage connections for operation by a cam mounted on the shaft 72. A cam 354 is located on shaft 72 to cooperate with a roller 344 on the end of a bell crank 345 pivoted on a shaft 366. Connected to the upper end of the vertical arm of bell crank 345 is a link 347, the forward end of which is pivoted on an operating arm 348 urged in a counterclockwise direction by a spring 349. After about the first quarter of the cycle of operation, cam 354 strikes the roller and rocks the crank 345 in a counterclockwise direction to push arm 348 and connected shaft 343 in a clockwise direction.

Turning to Fig. 12a, it is seen that such movement of shaft 343 causes the frame 316 to be moved toward the left, and then the pawls 328 and sensing levers 329 are brought into effective positions, wherein the pawls still remain out of contact with the ratchet teeth 99 but the feet 330 abut against the sides of the storage pins 197. Springs 333 form yieldable connections so that there is a cooperating connection between the movement of the sensing lever and the rocking movement of the pawl, as communicated through the pin and slot connection 332. When the feet 330 are obstructed from movement to the left by the presence of the storage pins, the levers 329 are rocked counterclockwise as the frame 216 moves them toward the left. The result is that the pin and slot connection is moved toward the left and the pawls 328 are withdrawn from the type bars.

The next function carried on for the sensing control is that of raising frames 324, so that the feet 330 slide along the sides of the adjusted storage pins 197 until the differential point is reached, marked by the top of the setting pin. It will be remembered as noted with reference to Fig. 11 that the amount represented by a storage pin is equivalent to the distance that the pin is lowered from a normal upper zero position. Since a pin representing 9 is in the lowest position, then the cooperating foot 330 is the first to slide off the side of the pin when raised. When the foot 330 slides off the top of a setting pin, it is released for control by the compression spring 333 which then rocks it in a clockwise direction and forces the pin and slot connection 332 toward the right, rocking pawl 328 counterclockwise and into cooperation with the ratchet teeth 99 of the type bar 147.

When the sensing device is controlled by a pin at "9," it is made operative early in the lifting part of the sensing operation and then there remain nine steps of upward movement through which the type bar is continuously engaged to add the digit 9. In a similar way all the other digit settings of the storage pins are analyzed by the sliding feet 330, so that should a pin stand at zero the foot is held to the right throughout substantially the entire raising movement of the sensing devices and is allowed to escape over the top of the sensing pin only at the very end of the movement when the pawl 328 is no longer effective to move the type bar but merely engage in the ratchet teeth.

As already noted, the set of vertically adjustable frames 324 are controlled by vertical reciprocation of the two cross-bars 336 and 337. These bars extend beyond both sides of the intermediate frames as seen in Fig. 11, and the upper bar 336 is proportioned longer than the lower bar, so that a pair of links 350 depending therefrom are in different planes from another pair of links 352 extending below the bottom bar 337. A pair of screw studs 351 is used as pivot points for links 350 on the ends of bar 336. Similar screw studs 353 are provided to pivotally secure the tops of links 352 to the lower bar 337. Reciprocation of the pair of restoring bars is controlled by the mechanisms shown in Figs. 15 and 16.

In Fig. 15, it is seen that the lower ends of links 350 are pivoted on cranks 355 which are fulcrumed loosely on shaft 116 and rocked in a counterclockwise direction by springs 356. Both cranks 355 are provided with follower rollers 357 cooperating with cams 358 fastened to the operating shaft 72. The cam is so proportioned that there is an idle movement of about one-half the operating cycle before a rise on the cam is effective to rock the cranks 355 in a clockwise direction. This movement serves to lift bar 336 (Fig. 1) and tension springs 338, which it will be remembered are connected to lugs 334 of the sensing frames 324 and thereby tend to lift the sensing pawls in cooperation with the storage pins and the type bars.

Cam 358 in Fig. 15 is proportioned to hold the restoring bar raised during the time that the type bar is restored downward to enter an amount into the selected storage device. The restoring bar is lowered after the entry of a new balance amount and, after the storage device is restored, then serves to pick up all sensing frames relating to orders wherein the digits have been entered, and carry them downward into the home position.

A similar set of operating connections is provided for the lower operating bail 337 as shown in Fig. 16. Links 352 are seen to be connected to a pair of cranks 360, also loosely pivoted on shaft 116. Springs 361 tend to rock these cranks in a counterclockwise direction and hold follower rollers 362 thereon in cooperation with a pair of cams 363 secured to the operating shaft 72. These cams 363 are proportioned to take effect at almost the same instant as the cams 358 (Fig. 15), so that both bars are moved upward at practically the same instant. It is through these connections of Fig. 16 that the upward movement of all denominational frames 324 (Fig. 12a) and the amount transferring devices held thereby, is made positive to drive the type bars in a vertical direction. Cam 363 (Fig. 16) differs from the other cam 358 in that the operating portion of it is shortened and arranged to allow restoration of cranks 316 for releasing the lower bail 337 before upper bail starts its downward movement. The reason for this is to remove the lower bail so that the sensing frames can be driven downward by the type bars at the time amounts are reentered into the storage device. Later in the cycle, springs 356 (Fig. 15) become effective and in lowering the upper bar 336 drive all the sensing frames down to the normal position shown in Figs. 1 and 12a.

Upon restoration of the typebars 147, the teeth 99 therein engage pawls 328 and drive them down, pushing levers 329 before them with feet 330 overlying storage pins 197 so that the pins are adjusted differentially in accordance with total amount being restored out of the type bars.

After the sensing devices have been reciprocated up and down, the horizontal moving controls come into effect to restore the entire unit toward the rear of the machine. Springs 349 (Fig. 14) are effective to rock the linkage as soon as the high point on cam 354 passes roller 344. When the shaft 343 is rocked counterclockwise (Fig. 12a), it pulls link 341 toward the right. This movement serves to draw the sensing feet 330 away from the reading position and also move pawls 328 away from the ratchet teeth 99 on the type bars 147.

Adjustment of the type bars is noted to be controlled from two sources in the same cycle. The type bars are lifted early in the cycle under control of the setting of the item amount keys, and then at about the mid-point of the cycle a further upward movement is imparted to represent the amount taken from the selected storage device. Since in any particular order the two digits entered from the setting sources may amount to more than 9, it is necessary to provide means for carrying or transferring units from lower to higher orders whenever the lower orders receive an aggregate movement of more than nine steps. It is for the same reason that the type bars are provided with a double set of digit type. These type are arranged starting with the zero type at the top and progress downward to a 9 type at the mid-point and then continue the progression with a zero type and all the other digits to the bottom 9 type.

As the operator for the carrying mechanism, each type bar is formed with a projecting tooth 365 (Fig. 12a), which cooperates with the pointed upper end of a carrying lever 366 loosely pivoted on a shaft 367 fastened between intermediate frames. Tooth 365 is normally positioned nine steps below the upper edge of the lever 366 and only comes into cooperation with the lever when the type bar is raised more than nine steps. A spring 368 is coiled around the shaft 367 and caught on lever 366, so that it tends to rock the lever in a clockwise direction to hold the upper end against the front edge of the related type bar. There is a set of such levers 366, one for each type bar, and a rearwardly projecting arm thereon is offset toward the higher order and abuts against a lug 370 projecting from the side of a transfer pawl 371 having an operating tooth for cooperation with the ratchet teeth 99 on the higher order type bar.

Each carrying pawl 371 is pivoted at 372 on its own operating lever 373 loosely mounted on a rod 374. A compression spring 375 is assembled between the carrying pawl and the operating lever to press the pawl toward the left and into engagement with the teeth on the type bar. However, the pawl is normally held disengaged by the abutment between lug 370 and the horizontal arm of operating lever 366. When a type bar is raised more than nine steps, tooth 365 is effective, the related crank 366 is rocked in a counterclockwise direction, and the rearward arm is lifted away from the lug 370 allowing pawl 371 to rock counterclockwise into engagement with a tooth 99 on the next higher order type bar. Then at the proper time in the cycle, after the upward movement caused by the sensing of the storage device, a carrying entry operation is induced by rocking the carrying levers 373 seriatim. In other words, the separate carrying parts are operated from the lower to the higher orders successively, so that should any of the carrying pawls be tripped they become effective to raise the next higher order type bar one step.

The carrying operation is effected by means of a multi-pronged cam 377 carrying a set of helically arranged cam points, each cooperating with a downward projection on one of the operating levers 373 and arranged at intervals so the units order cam is nearer to the related operating levers and all other cams are progressively spaced further away from the higher order levers to operate them progressively as a shaft 378 is rotated in a counterclockwise direction to carry the cam member 377 fastened thereon.

Figure 17:
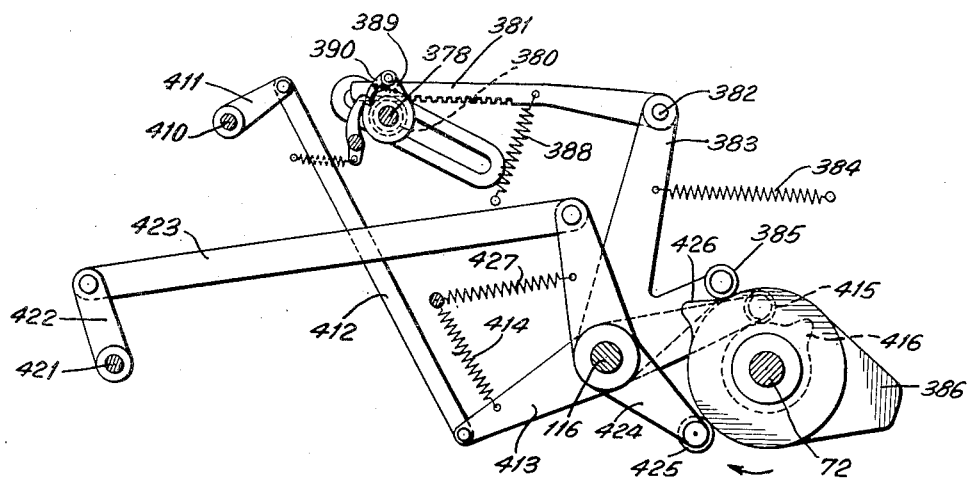
Fig. 17 is a detail view showing a number of operating controls for governing the timing, transferring and resetting, said controls cooperating with the carrying mechanism and the amount storage device, selected prior to carrying operation.
Figure 18:
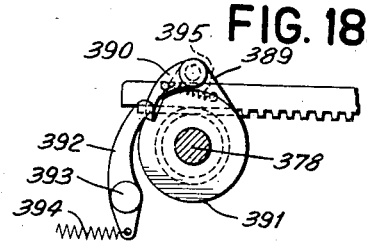
Fig. 18 is an enlarged detail of the operating mechanism for rotating the shaft carrying a spirally arranged carry operating cam for causing seriatim entry of units.

Carrying shaft 378 is driven through one revolution in a counterclockwise direction in a short interval, during each cycle, by means of the operating controls shown in Figs. 17, 18. There it is seen that attached to shaft 378 is a pinion 380 in mesh with a rack 381 pivoted at 382 on the end of an operating crank 383 loosely pivoted on shaft 116. A spring 384 is attached to crank 383 and serves to rock the crank in a clockwise direction, so that a roller 385 thereon tends to remain in cooperation with a cam 386 fastened to the operating shaft 72. Another spring 388 is attached to the rack 381 and tends to hold it down in mesh with the pinion 380. Attached to pinion 380 is a loosely mounted arm 389 carrying a pawl 390 cooperating with a single toothed disk 391 fastened to shaft 378. Also cooperating with the single tooth or notch is a stationary retaining pawl 392 pivoted at 393 and held in engagement by a spring 394. A small spring 395 is drawn between pawl 390 and the arm 389 on which it is pivotally mounted. The parts are so arranged that, when the cam 386 (Fig. 17) strikes the roller 385, crank 383 is rocked in a counterclockwise direction and rack 381 is shifted toward the left. Then the pinion 380 is rotated counterclockwise and carries along therewith the loosely pivoted arm 389 and the operating pawl 390. Also carried along is the notched disk 391 and shaft 378.

Turning to Fig. 12a, it is seen that the carry operating cam 377 mounted on shaft 378 has a series of teeth cooperating with projections on the under side of operating levers 373. Since these cam projections are helically arranged and since the first one made operative is normally adjacent and to the right of the projection on the under side of the tens order lever 373, this lever is lifted in a clockwise direction about rod 374 and, should the pawl 371 carried thereon be tripped by additions in the units order, then it is effective in cooperation with the rack teeth 98 to lift the tens order type bar 147 one step upward. In the same way the cam projections on operating member 377 are effective seriatim in cooperation with the higher order operating levers and serve to operate the carrying pawls to lift the selected type bars.

Shaft 378 and the attached cam member 377 are operated counterclockwise for one complete revolution and remains fixed for the remainder of the cycle. It is held from return movement because the drive connections (Fig. 18) are arranged to be unidirectional. When rack 381 (Fig. 17) is fully extended to the left by operation of cam 386, the notched disk 391 is fully revolved and back again in the home position, wherein it is held by the retaining pawl 392. Then, as the parts are restored by spring 384, rack 381 is drawn toward the right and pawl 390 ratchets idly over the concentric portion of disk 391 until the home position is reached, wherein it again snaps back into the notch in the disk.

Figure 19:
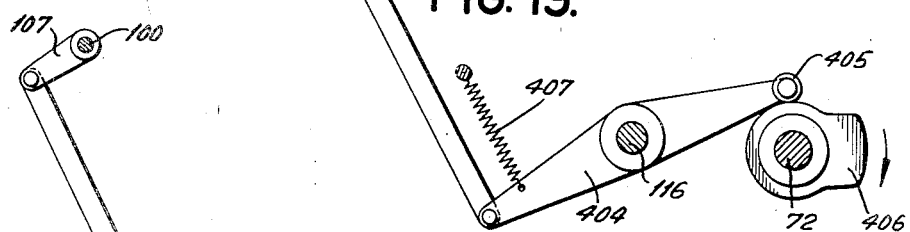
Fig. 19 is a detail view of an operating cam and linkage mechanism for resetting the carrying pawls.

After the series of carrying operations is completed, the pawls 371 (Fig. 12a) are restored so that lugs 370 are brought back into the normal abutting relationship with the extensions of levers 366. This restoration is accomplished by means of a restoring cam 400 attached to a shaft 401 and extending across the upper part of all the pawls. The shaft projects to the left of the intermediate frames and carries an operating arm 402 (Fig. 19). Pivoted on this arm is a link 403, the lower end of which is attached to a lever 404 loosely mounted on shaft 116. The lever carries a roller 405 cooperating with a cam 406 secured to shaft 72. A spring 407 is attached to lever 404 and tends to rock it in a clockwise direction and maintain cooperation with cam 406. After the carrying portion of the cycle has passed, a high cam point 408 strikes the roller 405 and rocks the lever in a counterclockwise direction to pull down on link 403. This serves to turn the arm 402 and rock shaft 401 in a counterclockwise direction.

Referring to Fig. 12a, it is seen that such movement causes the cam 400 to rock against any operated carrying pawl 401 and push it toward the right and rock it in a clockwise direction until the lugs 370 are all relatched.

Other resetting devices are provided to operate the carrying levers 366 to rock them counterclockwise, so that the top operating points are moved away from side of the type bars to permit the passage of transfer extensions 365 when the type bars are lowered for restoration. These resetting devices include a cam bar 409 fastened to a shaft 410 extending between the intermediate frames. On the outside of the frame, shaft 410 (Fig. 17) carries an arm 411 to which is pivoted a link 412. The lower end of the link is attached to a lever 413 loosely pivoted on shaft 116. Attached to lever 413 is a spring 414 tending to rock it in a clockwise direction and placing a roller 415 in cooperation with a cam 416 secured to the operating shaft 72.

At the proper time in the operating cycle, an extension on cam 416 strokes roller 415 and rocks lever 413 in a counterclockwise direction. This motion is carried through link 412 which pulls downward on arm 411 and rocks shaft 410 in a clockwise direction. In Fig. 12a it is seen that clockwise movement of cam 409 is effective to cause the cooperating levers 366 to rock in a counterclockwise direction, so that they are moved out of the path of the type bar extensions 365. Immediately following the lowering of the type bars, the carrying levers 366 are allowed to restore to the normal latching position. Operation of shaft 410 is coordinated with the operation of the carrying pawl restoring shaft 401, so that the latter is sure to place the carrying pawls in a latched position at the end of the cycle and in readiness for carrying operation on the next cycle.

The teeth 365 on the side of type bars 147 perform a double function in cooperation with the upper pointed edges of carry operating levers 366. As explained hereinbefore, as teeth 365 move upward, they trip the carry levers for carrying purposes. The other function is performed as the type bars are lowered, and then the teeth 365 strike the upper ends of the carry levers and are stopped thereby in a middle zero position. For example, should a type bar receive sixteen steps of upward movement, then it is positioned to represent the digit "6" and, when the type bar is lowered to add a digit in the storage device, it is desired that the type bar be moved down six steps rather than sixteen.

As explained later, the type bar restoration is divided into two parts, the first restoring movement being devoted primarily to the function of entering an amount in the storage device and then it is possible to stop the type bars short of the final zero position. In other words, any type bars depressed for restoring amounts greater than 9 are stopped at the intermediate zero position rather than the final or lower zero position. The second type bar depressing operation is provided for final restoration to zero, and for such operation the carrying levers 366 are rocked counterclockwise by the arms 409, so that the teeth 365 are free to pass downward as the type bars, which have been stopped at the intermediate zero position, are carried down ten more steps to the normal zero position. Shaft 410 carrying the restoring arms 409 is operated at the point in the cycle when the type bars are about to receive the second restoration movement.

There is a further advantage in providing two restoring movements for the type bars. Since the first movement is devoted to entries into the storage device, it may be eliminated when a clearing operation is desired to avoid entry of any amount back into the storage device. Then the second restoring operation is the only one that is effective, and it serves to carry the adjusted type bars downward through the full nineteen steps of adjustment when the related type bar has received the greatest possible amount of adjustment.

After the selected storage device has been adjusted to represent the new balance, it is necessary to lower it as a unit into the magazine before the magazine can be restored to the normal centralized position. Although the lifting sleeve 280 (Fig. 11) is lowered at the proper time, it is advisable to make the restoration positive, and for this purpose an arm 420 (Fig. 12a) is arranged to cooperate with the top edge of one of the frame members 194 of the extended storage device. The operated end of arm 420 is secured to a shaft 421 (Fig. 17) which extends beyond an intermediate frame and carries an arm 422 upon which is pivoted a link 423. The rear end of the link is pivoted on a crank 424 loosely pivoted on shaft 116. The crank carries a roller 425 which is held in cooperation with a cam 426 by a spring 427 attached to the crank. For the major portion of the operating cycle, the roller cooperates with a concentric surface of cam 426. At a time immediately following the entry of an amount into the storage device, and substantially coincident with the downward withdrawal of the lifting sleeve, the high point of cam 426 strokes roller 425 and rocks crank 424 in a clockwise direction. This causes link 423 to move toward the right and shaft 421 is rocked clockwise also. Referring to Fig. 12a, it is seen that when arm 420 is rocked clockwise, the operating end cooperates with the top of the projecting storage device and pushes it down into the magazine frame.

It is mentioned hereinbefore that the type bars 147 are operated near the end of the cycle for two restoring movements. The devices for causing such operations are shown in Figs. 1 and 13. In Fig. 1 it is seen that each type bar carries a pin 430 extending from one side face at a point near the top. Projecting into the spaces between the type bars are a series of restoring levers 431 loosely pivoted on a shaft 432. There is one such restoring lever for each type bar. Underlying all levers 431 is an operating bail 433 formed with a pair of arms also loosely pivoted on shaft 432. This restoring bail 433 is connected to another operating bail 434 by a pair of links 435. The lower bail is connected to a shaft 436 (Fig. 13) which projects beyond the intermediate frames for control by operating connections. Fastened to shaft 436 is an arm 437 carrying a link 438. The lower end of the link is pivoted on a bell crank 439 loosely mounted on shaft 346. The crank carries a roller 440 cooperating with a cam 441 having a pair of operating lobes 442 and 443. A spring 445, connected to arm 437, tends to hold the linkage in such a direction that it is held in cooperation with cam 441.

Late in the operating cycle, the first lobe 442 strikes roller 440 and rocks crank 439 in a clockwise direction. Through the linkage, shaft 436 is rocked counterclockwise and, as shown in Fig. 1, this serves to draw down on links 435, and swing bail 433 down from below the restoring levers 431. Connected between the levers and the lower bail 434 is a series of operating springs 446, one for each restoring lever and, when downward operations are caused, these springs are tensioned and the restoring levers 431 strike the pins 430 in any of the adjustable positions and tend to carry the type bars 147 down to the restored position. However, at the time this first cam lobe is operative, it will be remembered that the carrying levers 366 (Fig. 12a) remain in an abutting relation with respect to the teeth 365 on the type bars. Therefore, any type bar which has been lifted above the intermediate zero position will restore only part way back, and that is back to the intermediate zero position. For the remainder of the downward stroke, springs 446 are tensioned and, as the cam 442 (Fig. 13) passes the follower roll, the restoring levers are again lifted before the second cam lobe 443 takes effect to provide the final downward thrust to the restoring levers. It is during the intermission between the operation of the two cam lobes that the carrying levers 366 are disengaged, so that the final restoration movement is fully effective to carry all type bars down to the lower zero and home position against bar 96 (Fig. 1).

There are times when it is desired that the first restoring movement be ineffective to cause a downward movement of the type bars. When a clearing operation is selected, it is desired that the amount be read out of the storage device without returning any new balance amount therein. In order to avoid entry of total or item amounts into the storage unit, the type bars are prevented from being lowered during that time when the storage device remains projected above the magazine frame. In order to prevent effective restoring operation during the first movement, levers 431 (Fig. 1) are formed with rearwardly extending arms 450 over which a bail 451 is arranged to cooperate to prevent counterclockwise restoring movement of the levers. Bail 451 is shown in the tripped position where it is effective to prevent entry of a new balance amount into the storage unit. It is so positioned for a clearing operation. The bail is fastened to a shaft 452 (Fig. 2) which projects outside the right intermediate frame 49 and there carries a latching arm 453 normally abutting against the bottom end of an armature lever 454. The armature is associated with the magnet NP which is energized whenever a clearing operation is desired. Whenever the magnet is energized, the armature 454 is rocked counterclockwise and a spring 455 pulls latch arm 453 and shaft 452 in a counterclockwise direction to shift the bail 451 (Fig. 1) above the arms 450 of the restoring levers and hold them in the normal ineffective position during the time that the restoring bail is lowered to pull on springs 446.

Near the end of each operating cycle, the clearing devices are restored to allow free movement of the restoring levers for the final restoring movement of the type bars, which is independent of entry of amounts into the storage unit. These restoring devices include a crank 458 loosely pivoted on shaft 452 and provided with a pin overlying the latch 453. Pivoted on arm 458 is a link 459 attached to a bell crank 460 having a follower roller 461 cooperating with a cam 462 fastened to the operating shaft 72. Crank 460 is loosely pivoted on shaft 346 and has a spring 463 which tends to rock it in a counterclockwise direction. When cam 462 becomes effective, it operates the crank in a clockwise direction, so that the upper arm 458 is also rocked clockwise to carry latch 453 down into normal latching relation with respect to the bottom of the armature 454. At the same time, shaft 452 (Fig. 1) is rocked clockwise and carries bail 451 away from the rear ends of the restoring levers 431, so that they are free to be rocked counterclockwise for the second restoring movement to bring the type bars down to the home position.

The timing chart shown in Fig. 21 reveals the operating sequence of the many cams provided in the machine. There it is seen that early in each operating cycle the differential devices under control of the amount and account number keys are the first to move and effect a setting of the type bars. Although the differential devices associated with the amount keys and type bars are set shortly before the 90° interval, the account number differentials are maintained for most of the 360° of operating control in order that the magazine may have a reference point from which to work. Shortly after the key controlled differentials are fully adjusted, the magazine moving cam 269 goes into effect and at about the same time the printing cam 171 operates to effect a listing operation. The type bar latch pawls 86 are move into operation by cam 119 to permit free upward movement of the type bars but to prevent downward restoring movement before the listing and totaling impressions are effected. After the magazine is fully adjusted, the cam 296 takes effect to elevate the selected one of the storage devices. Shortly thereafter, near the mid-point of the cycle, the value sensing devices are given first a horizontal movement by cam 354 and then a vertical movement by cams 358 and 363 to take a reading of the storage amount and transfer it to the type bars.

After a reading is taken of the stored amount, the carrying mechanism is operated by cam 366 to effect successive transferring operations at about the same time that the storage setting pins are elevated by cam 311 to bring them up to the zero position ready for the entry of a new balance amount. At 225° in the operating cycle, the type bars are depressed by cam 441 to enter a new balance amount into the storage device. Should it be desired to eliminate the entry of a new balance amount, the non-storing bail is effective and later restored by cam 452 during the interval between type bar restorations. The selected storage device is restored by cam 296 immediately before the movement of the magazine back to the centralized position. This is followed by final restoration of the type bars by cam 441.

In the wiring diagram shown in Fig. 22, it is seen that a pair of main lines 470, 471 is connected through the motor MR when the motor switch 472 is closed in series with the motor between the two main lines. Three pairs of contacts 473—478 are provided with series connections to the main clutch magnet MC and the printer control magnet PC. These three contact groups are associated with the three control keys shown in Fig. 3. The first pair of contacts 473, 474 is normally opened and operated by the listing key 51. The second pair of contacts 475, 476 is closed by the total key 52, and the third pair 477 and 478 is operated by the clearing control key 53. When the list key is depressed (Fig. 22), a circuit is set up through the print control magnet PC early in the operation, because a pair of cam contacts 479 are in series therewith and operated by a cam 480 on shaft 72. The circuit includes line 470, wire 483, contacts 473, wire 484, contacts 479 closed early in the cycle, wire 485, magnet PC and wire 486 to the other line 471. Magnet PC then releases the printer as explained with reference to Figs. 1 and 2.

Whenever any of the three control keys are depressed, the machine is clutched for operation by energization of the main clutch magnet MC. The circuit for this magnet passes through any one of the three lower contacts 474, 476 or 478. Assuming that the list key 51 is the one depressed, then the circuit follows the path through line 470, wire 483, contacts 473, contacts 474, wire 488, normally closed contacts 489 operated by a cam 492, wire 490, clutch magnet MC, wire 491, wire 486 and line 471. Contacts 489 open to deenergize magnet MC in readiness for another cycle of operation.

Depression of the total key 52 causes operation of the machine clutch magnet MC and also causes energization of the print clutch magnet PC, but the timing of operation of the latter is delayed so that it occurs at a time in the operating cycle after the type bars have received not only the amount set up on the keys, but also the amount read out of the storage device (i. e., after 145°). The total printing circuit includes line 470, wire 493, contacts 475, cam contacts 494, wire 485, magnet PC, wire 486 and line 471. The cam 495 for operating contacts 494 is attached to shaft 72 and proportioned to cause closure of the contacts at a point shortly before the 180° mark in the operating cycle.

The contacts 477 and 478 operated by the clearing key 53 are connected so that they effect operation of the machine while calling in the print control magnet PC and, along therewith, the magnet NP is operated to prevent entry of an amount into the storage device as already explained. The circuit for magnet NP includes line 470, wire 497, contacts 477, wire 498, magnet NP, wire 499 and the line 471. The clearing print impression is caused by closure of cam contacts 494 so that it is delayed to be a total recording rather than an item listing operation.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a printing machine, a plurality of manipulative devices for setting up an amount, a plurality of manipulative devices for setting up an account number, differential devices controlled by said amount devices, a set of type bars each carrying a double set of numeral type, means under control of said differential devices for adjusting said type bars, a magazine, a plurality of amount storage devices assembled in said magazine, each device containing a plurality of settable pins for adjustment to represent amounts, a pair of differential devices adjusted by said manipulative account number devices, means under control of one of said last mentioned differential devices for shifting said magazine laterally, means under control of the other of said pair of differential devices for shifting said magazine longitudinally, said magazine receiving composite movement horizontally to place one of said plurality of storage devices in a selected position, means for elevating the selected storage device into cooperative relation with said type bars, amount reading devices cooperating with the settable pins of said selected storage device, means for moving said amount sensing devices into and out of reading position, operating pawls included in said amount sensing devices and cooperating with said type bars, means for lifting said amount sensing devices while in cooperation with said settable pins to take a reading thereof and transmit the same through said pawls to cause adjustment of said type bars in addition to the adjustment caused by the amount differential, a carrying mechanism cooperating with the type bars to cause additional steps of movement of higher order bars under control of lower order bars, means for effecting a recording impression from the adjusted type bars, means for clearing the selected storage device by resetting the pins therein, means for restoring the type bars with said pawls and sensing means cooperating therewith to reenter a total amount into the pins of the selected storage device, means for preventing restoration of said type bars to maintain the selected storage device in the cleared condition, and means for lowering said selected storage device into the magazine, said restoring means being operated for a second time in each cycle for operation of said type bars to restore them independently of amount storing operations.

2. In a printing machine, manipulative devices for setting up an amount, a plurality of manipulative devices for setting up an account number, differential devices controlled by said amount devices, a set of type bars each carrying a double set of numeral type, means under control of said differential devices for adjusting said type bars, a magazine, a plurality of amount storage devices assembled in said magazine, each device containing a plurality of settable pins for adjustment to represent amounts, a pair of differential devices adjusted by said manipulative account number devices, means under control of one of said last mentioned differential devices for shifting said magazine laterally, means under control of the other of said pair of differential devices for shifting said magazine longitudinally, said magazine receiving composite movement horizontally to place one of said plurality of storage devices in a selected position, means for elevating the selected storage device into cooperative relation with said type bars, amount reading devices cooperating with the settable pins of said selected storage device, means for moving said amount sensing devices into and out of reading position, operating pawls included in said amount sensing devices and cooperating with said type bars, means for lifting said amount sensing devices while in cooperation with said settable pins to take a reading thereof and transmit the same through said pawls to cause adjustment of said type bars in addition to the adjustment caused by the amount differential, and means for effecting a recording impression from the adjusted type bars.

3. In a printing machine, a set of type bars each carrying two sets of digit type arranged in serial order one set above the other, said bars being formed with a line of ratchet teeth and a carry extension, means for adjusting said bars to represent an amount, a second means for adjusting said bars to add another amount, carry mechanism between the bars, said mechanism including a tripping lever operated by the extension of one bar when it is adjusted further than nine steps, and including a pawl controlled by said lever and cooperating with the teeth of the next higher order bar to adjust it one step further, and including operating means for operating said pawls seriatim from lower to higher orders to shift the type bars to add carry units.

4. The combination set forth in claim 3 with said second adjusting means including a plurality of storage devices, means for selecting a storage device, means between said type bars and said selected storage device for transferring amount representing adjustment from one to the other, means for timing the effectiveness of said transferring means, and means for restoring said type bars while said transferring means is effective to transfer the setting of the type bars to the storage device, said tripping levers cooperating with said extensions as zero stops upon restoration to determine the extent of restoring movement which corresponds to the amount transferred to the storage device.

5. The combination set forth in claim 3 with means for effecting early and late printing impressions from said type bars in the same cycle, and devices for causing operation of said impression means after operation of the first mentioned adjusting means to print items and operation of said impression means after operation of said second adjusting means to print totals.

6. In an accounting machine, a set of type carriers, means for setting up amounts, means under control of said setting means for adjusting said carriers linearly to represent an amount, a storage device with settable members displaced linearly and differentially with respect to the device to represent a stored amount, means cooperating with said members and carriers for sensing the displacement of the members and further adjusting said carriers in accordance therewith to represent a total amount.

7. A machine according to claim 6 with a carrying means cooperating with the type carriers to impart still further adjustment of unitary linear movement to higher order carriers when lower order carriers move more than nine steps.

8. A machine according to claim 6 with means for restoring said settable members to zero positions, means for restoring said type carriers, and wherein said sensing means is retroactive under control of said carriers and carrier restoring means for setting said members to represent the total amount.

9. In an accounting machine, means for entering data, a plurality of data storage devices with members adjusted therein to represent stored data, data registering means, a magazine wherein said devices are retracted and out of cooperation with said registering means, means for selecting one of said storage devices, means for projecting the selected storage device out of the magazine and into cooperation with said registering means, means under control of said entering means for adjusting said registering means, means for sensing the setting of the selected members and adjusting said registering means further, means for resetting the members of the selected device, means for resetting said registering and sensing means to react on said members and adjust them in accordance with the final setting of said registering means, and means for retracting the selected device into the magazine.

10. The machine of claim 9 wherein the sensing means includes connected pairs of pawls, a sensing pawl cooperating with a storage member and an operating pawl cooperating with a related registering means so that either is operated under control of the other.

11. In an accounting machine, means for entering amounts, amount registering devices, means under control of said entering means for adjusting said registering devices, units and tens banks of account number keys, a magazine holding a plurality of amount storage devices, each of said devices relating to an account, said storage devices being arranged in rows and columns and disposed with reference to a single point so that devices of odd numbered accounts are arranged in the front of the magazine and the devices relating to even numbered accounts are at the rear of the magazine, a further disposition relative to the central point providing that the devices relating to accounts identified by smaller numbers be arranged to the right and those of larger numbers to the left, means associated with the magazine for adapting it for adjustment longitudinally and transversely relative to said central point at which said set of registering devices is located, means under control of said tens order bank of keys for determining the odd or even nature of said account number, means under control of said tens order bank of keys for determining the magnitude of said account number above or below a certain account number, means under control of both determining means for selecting the direction of movement of said magazine longitudinally and transversely, means under control of said units order keys for determining the extent of movement of said magazine longitudinally, means under control of said tens bank of keys for determining the extent of movement of said magazine transversely, and means cooperating with the selected storage device and the registering devices for transferring amounts from one to the other.

12. The machine set forth in claim 11, in which said determining means includes a series of cams adjusted under control of the banks of keys, a stepped cam adjusted by the units order keys and three other cams adjusted by the tens order of keys including a wave-shaped cam for indicating odd and even conditions, a stepped cam for indicating small and large numbers and a notched cam for determining the extent of magazine movement.

13. In a printing machine, means for entering amounts, a set of type bars, means under control of said entering means for adjusting said type bars, amount storage devices, means under control of said storage devices for adjusting said type bars, said type bars containing two sets of numeral type and formed with a series of ratchet teeth, a set of carrying levers cooperating with carrying extensions on said type bars and normally disposed nine steps away from said carrying levers, a set of carrying pawls with latching connections to said carrying levers, each of said pawls cooperating with ratchet teeth on a type bar of a higher order than the one with which the related carrying lever cooperates, and means for oscillating said set of carrying pawls to lift all unlatched pawls and corresponding type bars for one step of movement after said bars have been adjusted by both the entering means and the storage devices.

14. The combination set forth in claim 13 including a set of retaining pawls cooperating with the ratchet teeth on said type bars to hold them elevated in positions of adjustment, means for restoring the type bars, and means for disengaging said retaining pawls during operation of said restoring means.

15. The combination set forth in claim 13 including means for disengaging said carrying levers from cooperation with said type bars, means for restoring said type bars, and means for operating said disengaging means during operation of said restoring means.

16. In an accounting machine, means for entering amounts, a set of amount registering devices, means under control of said entering means for adjusting said registering devices, a plurality of storage devices, means for selectively bringing one of said storage devices into cooperation with said registering devices, connections between said registering devices and the selected storage devices, means for making said connections effective during a certain period of the operating cycle, means for restoring said registering devices, said restoring means operable at two intervals during said operating cycle, one of said intervals coinciding with said certain period and the other interval following said certain period, and means for locking said restoring means to prevent restoration during said certain period whereby amounts are prevented from being transferred from said registering devices to said selected storage device.

17. The combination set forth in claim 16, including a relay for controlling operation of said locking means, a clearing key, means under control of said clearing key for energizing said relay, and means for restoring said locking means at the end of each cycle.

18. In a printing machine, manipulative devices for setting up an amount, a plurality of manipulative devices for setting up an account number, differential devices controlled by said amount devices, a set of type bars each carrying a double set of numeral type, means under control of said differential devices for adjusting said type bar, a magazine, a plurality of amount storage devices assembled in said magazine, each device containing a plurality of settable pins for adjustment to represent amounts, means under control of said account number manipulative devices for shifting said magazine horizontally to place one of said plurality of storage devices in a selected position, means for elevating the selected storage device into cooperation with said type bars, amount reading devices cooperating with the settable pins of said selected storage device, means for moving said amount sensing devices into and out of reading position, operating pawls included in said amount sensing devices and cooperating with said type bars, means for lifting said amount sensing devices while in cooperation with said settable pins to take a reading thereof and transmit the same through said pawls to cause adjustment of said type bars in addition to the adjustment caused by the amount differential, a carrying mechanism cooperating with the type bars to cause additional steps of movement of higher order bars under control of lower order bars, means for effecting a recording impression from the adjusted type bars, means for restoring the type bars with said pawls and sensing means cooperating therewith to reenter a total amount into the selected storage device, and means for lowering said selected storage device into the magazine.

19. In an accounting machine, means for entering amounts, means for setting up an account number, a magazine holding a plurality of amount storage devices, each related to an account number, a set of amount registering devices normally centralized with respect to said magazine, means under control of said entering means for adjusting said registering devices to represent an amount, means under control of said number setting means for shifting said magazine relative to said set of registering means to align a selected storage device with said registering means, means cooperating with said registering means and the selected storage device for transferring amount adjustments from either one to the other, said shifting means including mechanism for guiding said magazine for longitudinal and transverse movement relative to said centralized registering devices, means for controlling the direction and means for controlling the extent of magazine movement, pairs of devices cooperating with said extent controlling means and connected to said magazine shifting means, an operator for said magazine shifting means, connecting devices between said operator and said pairs of devices, and means under control of said direction control devices for shifting said connecting means to make operative one or the other of said pairs of devices.

20. In a printing machine, a keyboard, a set of type bars, means under control of the keyboard for adjusting said type bars to represent item amounts, a magazine with a plurality of amount storage devices, each device having settable means for representing amounts, said magazine being normally centralized with respect to said set of type bars, means for selectively positioning said magazine to align a selected one of said storage devices with said type bars, means cooperating with the set of type bars and the selected storage device for adjusting either one under control of the other to represent item and total amounts, means for effecting a printing impression from said adjusted type bars, said means operable at either of two times in a cycle, after item amount adjustment or after total storage amount adjustment, an item entry key, means under control of said item key for initiating operation of said impression means to print an item, a total key, and means under control of said total key for operating said initiating means for initiating operation of said impression means to print a total.

FRED M. CARROLL.
ALFRED B. BENSON.

REFERENCES CITED

The following references are of record in the file of this patent:

UNITED STATES PATENTS

| Number | Name | Date |
|---|---|---|
| 977,333 | Schooling | Nov. 29, 1910 |
| 1,120,746 | Rinsche | Dec. 15, 1914 |
| 1,205,298 | Werner | Nov. 21, 1916 |
| 1,898,048 | Goldberg | Feb. 21, 1933 |
| 2,029,776 | Jacob | Feb. 4, 1936 |
| 2,041,977 | Sundstrand | May 26, 1936 |
| 2,057,606 | Campos | Oct. 13, 1936 |
| 2,117,451 | Robertson | May 17, 1938 |
| 2,142,346 | Breitling et al. | Jan. 3, 1939 |
| 2,226,980 | Rast | Dec. 31, 1940 |